United States Patent [19]
Tsuboka

[11] Patent Number: 5,381,513
[45] Date of Patent: Jan. 10, 1995

[54] TIME SERIES SIGNAL ANALYZER INCLUDING NEURAL NETWORK HAVING PATH GROUPS CORRESPONDING TO STATES OF MARKOV CHAINS

[75] Inventor: Eiichi Tsuboka, Osaka, Japan

[73] Assignee: Matsushita Electric Industrial Co., Ltd., Osaka, Japan

[21] Appl. No.: 213,480

[22] Filed: Mar. 16, 1994

Related U.S. Application Data

[63] Continuation of Ser. No. 901,580, Jun. 19, 1992, abandoned.

[30] Foreign Application Priority Data

Jun. 19, 1991 [JP] Japan .................. 3-147440

[51] Int. Cl.⁶ ............................. G10L 9/00
[52] U.S. Cl. .................... 395/2.41; 395/2.65
[58] Field of Search ......... 395/2.11, 2.41, 2.64–2.66

[56] References Cited

U.S. PATENT DOCUMENTS 4,885,757 12/1989 Provence ................. 375/96
5,228,087 7/1993 Bickerton ................ 381/43

FOREIGN PATENT DOCUMENTS 3181998 8/1991 Japan .

OTHER PUBLICATIONS

Chong et al., "Classification and Regression Tree Neural Networks For Automatic Speech Recognition", Inter. Neural Network Conf. INNC 90 Paris, Jul. 9–13, 1990, pp. 187–190.
"Dynamic Neural Network—A New Speech Recognition Model Based On Dynamic Programming and Neural Network", Sakoe et al., NEC Corp. pp. 25–30, 1987.
"Neural Network Driven Hidden Markov Model", Tsuboka, Matsushita Electric Industrial Co., Ltd., pp. 55–62, 1989.
"A Multi-Layered Neural Network With Time Series Processing Ability", Tsuboka et al., Matsushita Electric Industiral Co., Ltd, & Osaka University, pp. 63–70, 1991.
"Speaker-Independent Word Recognition Using A Neural Prediction Model", Iso et al., IEEE 1990, pp. 441–444.
"Neural Predictive Hidden Markov Model", Tsuboka et al., Matsushita Electric Industrial Co., Ltd. & Osaka University, pp. 1341–1344, Nov. 1990.

Primary Examiner—Allen R. MacDonald
Assistant Examiner—Michelle Doerrler
Attorney, Agent, or Firm—Wenderoth, Lind & Ponack

[57] ABSTRACT

A neural network with a high recognition rate when applied to static patterns is made applicable to dynamic time series patterns such as voice signals. Plural units with one or more inputs and outputs are interconnected, and a unique load coefficient is assigned to each connection to weight the signals flowing through that connection. The neural network includes an input unit group to which are input the components of plural vectors included in the input feature vector series $\{y(t)\}$; an output unit which outputs the converted vectors, which are produced by passing the input vectors through each unit and the associated connections; and J paths from input unit group to the output unit group. The units are connected to form a Hidden Markov Model wherein each signal path identified as $j=1, 2, \ldots, J$ corresponds to the same state.

7 Claims, 23 Drawing Sheets

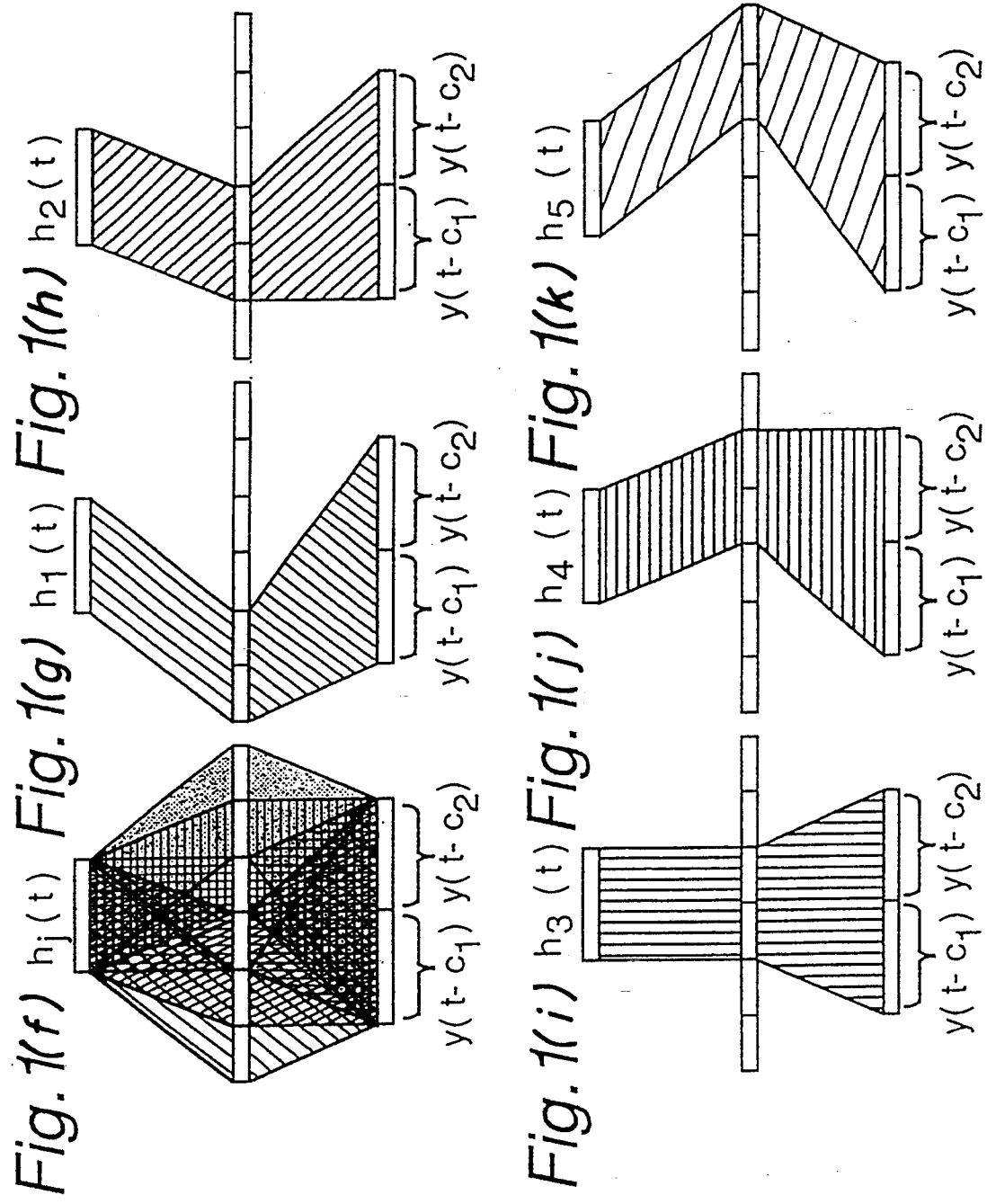

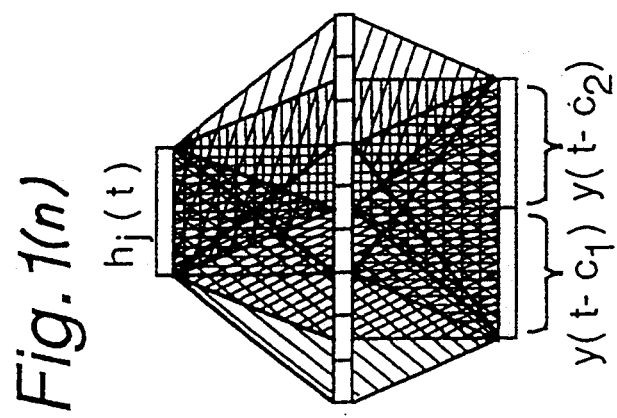
Fig. 1(n)
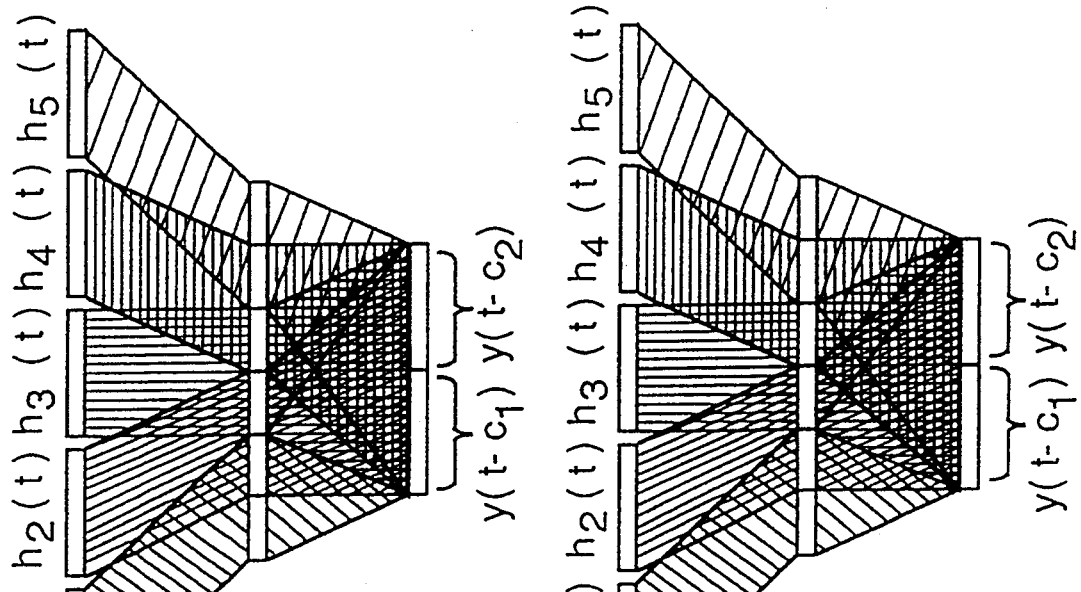
Fig. 1(l)
Fig. 1(m)

$$f(y) = \frac{2}{1+e^{-y}} - 1$$

$$f'(y) = \frac{1}{2}\{1 - f(y)^2\}$$

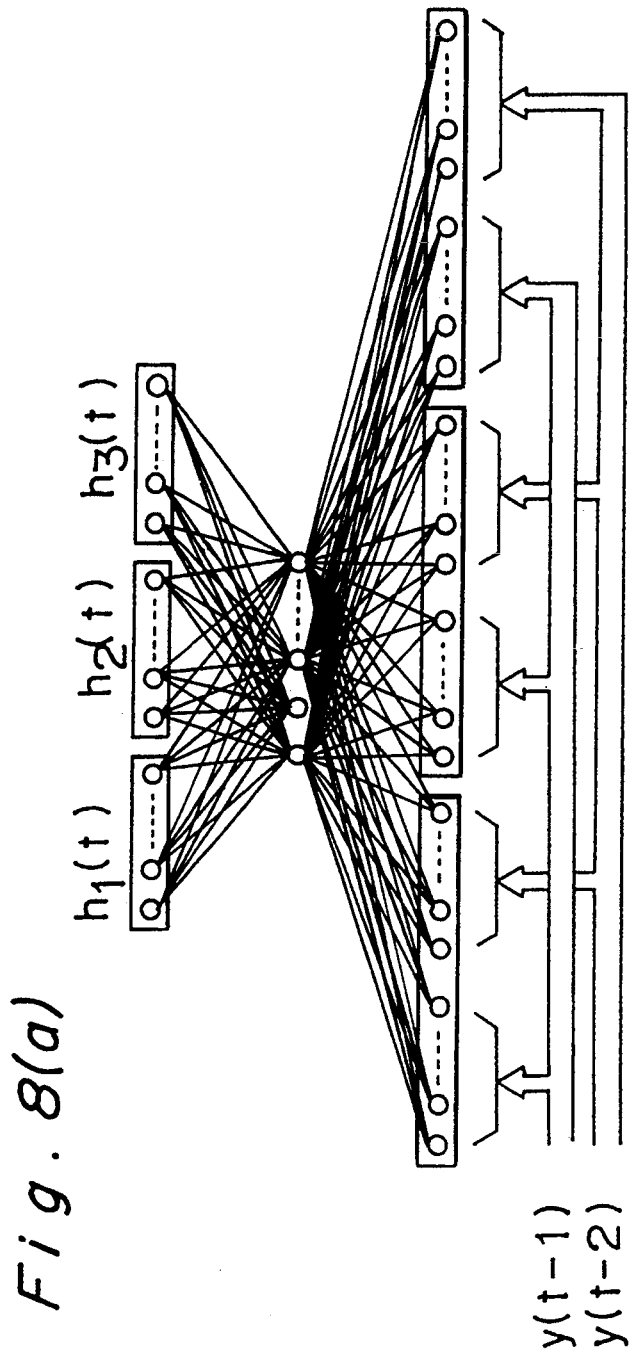

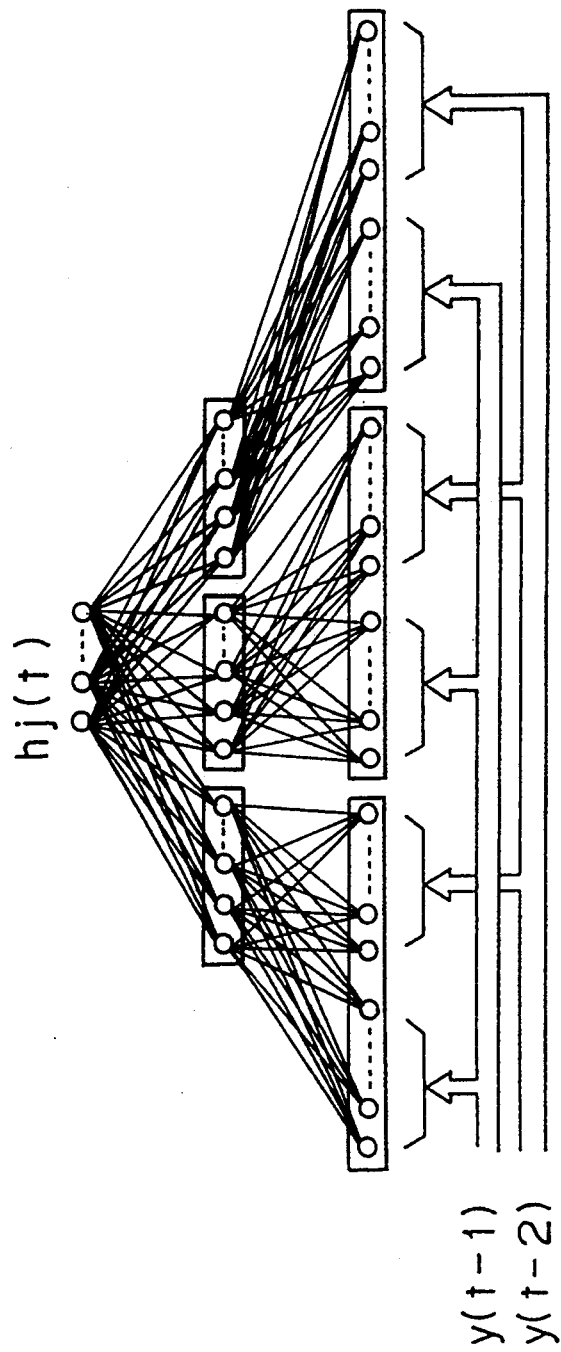

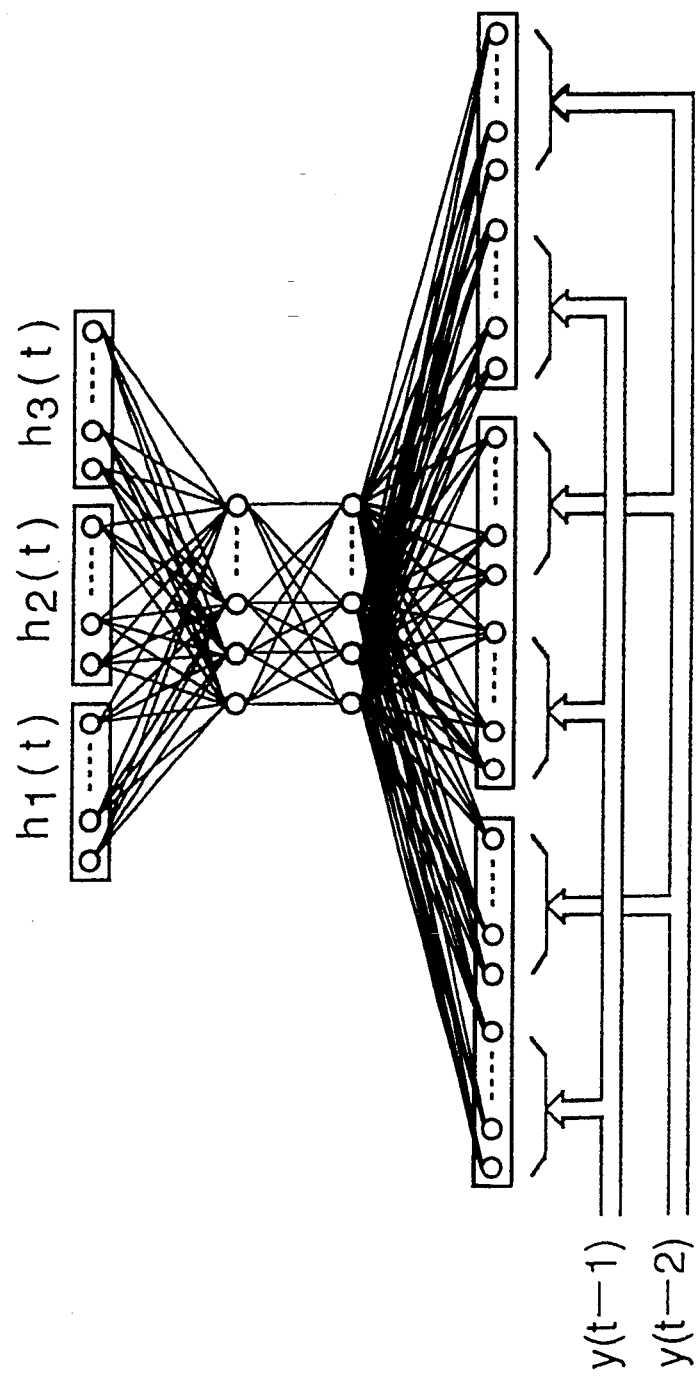

TIME SERIES SIGNAL ANALYZER INCLUDING NEURAL NETWORK HAVING PATH GROUPS CORRESPONDING TO STATES OF MARKOV CHAINS

This application is a continuation of now abandoned application Ser. No. 07/901,580, filed Jun. 19, 1992, now abandoned.

BACKGROUND OF THE INVENTION

1. Field of the Invention

The present invention relates to a time series signal analyzer comprising a new neural network suitable for pattern recognition in voice recognition applications and other time series signal recognition applications.

2. Prior Art

FIG. 2 is an example of the hierarchical neural network used in the present invention. The arrows between neuron units indicate the direction of signal flow. A specific weighting coefficient is applied to the output from the unit from which each arrow starts, and the weighted output is thus input to the destination neuron to which the arrow points. Each row of neurons is called a layer, and there are thus three layers shown in this sample neural network. The layer of neuron units directly connected to the inputs to the neural network is called the "input layer," the layer from which the output of the neural network is output is the "output layer," and all other layers are called "hidden layers" or "intermediate layers."

In this example the first layer is the input layer, the second layer is the intermediate layer, and the third layer is the output layer. The relationship between the sum of inputs to and the output from a neuron unit is typically defined by assigning a so-called Sigmoid function. FIG. 3 is an example of this Sigmoid function. In addition, a linear function is normally assigned to the input layer rather than a Sigmoid function to simply throughput the input to the input layer.

By adjusting the weighting coefficients of the neural network, the desired output can be obtained as the output from the output layer for a given pattern input to the input layer. To illustrate, think of how the letters "A," "B," and "C" are distinguished. In its simplest form, a neural network works by overlaying a grid of, for example, 32×32 squares to each character to be recognized where each square of the grid corresponds to one neuron unit (in this case there are 32×32=1024 input units). Each square containing part of a line in the character outputs a 1 and each square not containing a line component outputs a 0 to the corresponding unit of the neural network input layer. The output layer consists of three units such that when the letter "A" is input to the input layer the first output layer unit outputs "1" and the other units output "0"; similarly, when a "B" is input, the second output layer unit outputs "1" and the other units "0," and when "C" is input, the third output layer unit outputs "1" and the other units "0." The neural network is then trained by inputting many different samples to adjust the weighting coefficients until these results are obtained. Once the neural network is trained, an unknown input, such as "X," can be recognized as either "A," "B," or "C" based on which output unit has the highest value. In a hierarchical neural network, there are ways of guessing the weighting coefficient from plural training patterns, and a high real recognition rate can be obtained in conventional character recognition applications.

Problem to be Solved

This recognition process has been shown to be effective with input patterns of a fixed size (1024 bits in this example), but other problems are faced with patterns having a variable pattern size, e.g., voice patterns, which have a variable time base. The feature quantities of a voice are often expressed as a so-called feature vector series converted to approximately 10–20 parameter sets every 10 msec. Thus, if the voice is converted to a 10-dimension feature vector every 10 msec, the period required to express a phoneme /b/ may be 20 or possibly 30 frames. Thus, even if each of the parameters defining the feature vector corresponds to one input unit of the neural network, the total number of inputs required for pattern recognition is variable and may be (20×10=)200 to (30×10=)300 input units. In addition, it is extremely difficult to apply a conventional neural network to voice recognition because voice compression and expansion to the time axis is non-linear.

SUMMARY OF THE INVENTION

Therefore, an object of the present invention is enable the application of a neural network with a high static pattern recognition rate to dynamic time series patterns such as a voice signal.

To achieve this object, a neural network according to the present invention comprises plural interconnected units with one or more inputs and outputs and a unique weighting coefficient defined for each connection of the unit to weight the signals passing through that connection. These units are grouped into an input unit group for inputting the components of the plural vectors included in the feature vector series $\{y(t)\}$ of the input, and an output unit group for outputting the converted vectors, which are converted by passing the vectors input to the input unit group through the input units and the connections between the input units and the output units. There are J paths between the input unit group and the output unit group, and the paths identified as $j=1, 2 \ldots J$ are defined by a Hidden Markov Model (HMM) whereby each path corresponds to a specific state.

Selection of the paths in this neural network is controlled according to the state of the Hidden Markov Model.

BRIEF DESCRIPTION OF THE DRAWINGS

The present invention will become more fully understood from the detailed description given below and the accompanying diagrams wherein:

FIGS. 1(f)–1(n) show the construction of a neural network according to the first embodiment of the present invention, FIG. 9 shows the construction of a neural network according to a further alternative embodiment of the present invention.

DESCRIPTION OF PREFERRED EMBODIMENTS

The present invention applies a Hidden Markov Model state to the paths from the input layer to the output layer of a neural network as a means of introducing a time series signal processing capability to a hierarchical neural network used for pattern conversion. It is thus possible to overcome the inability of conventional neural networks to process time series signals, and expands the excellent static pattern recognition capability of the neural network to dynamic time series pattern processing.

The detailed description of the invention therefore starts with a description of the Hidden Markov Model (HMM hereinbelow). Furthermore, while the present invention is applicable to processing standard time series signals, for simplicity the below description applies specifically to processing applicable to speech recognition.

A speech recognition device using a HMM is described first.

Figure 2:
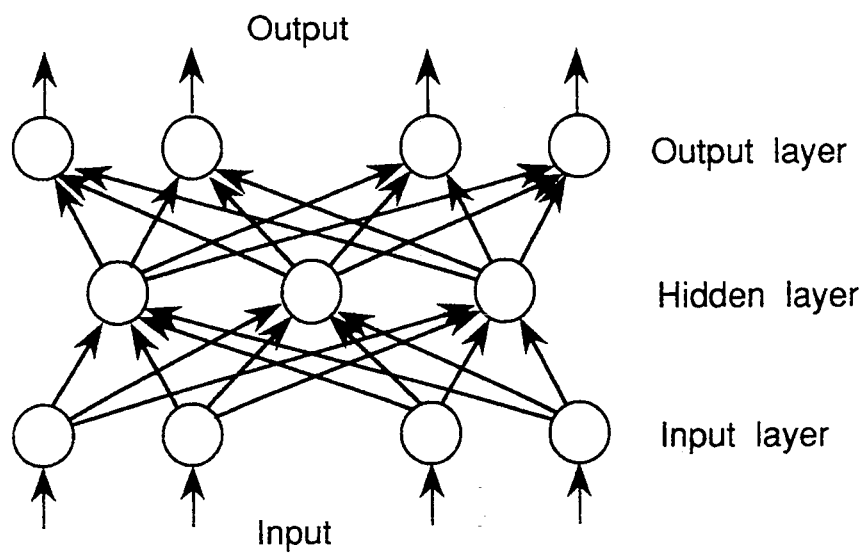
FIG. 2 shows the construction of a hierarchical neural network.
Figure 3:
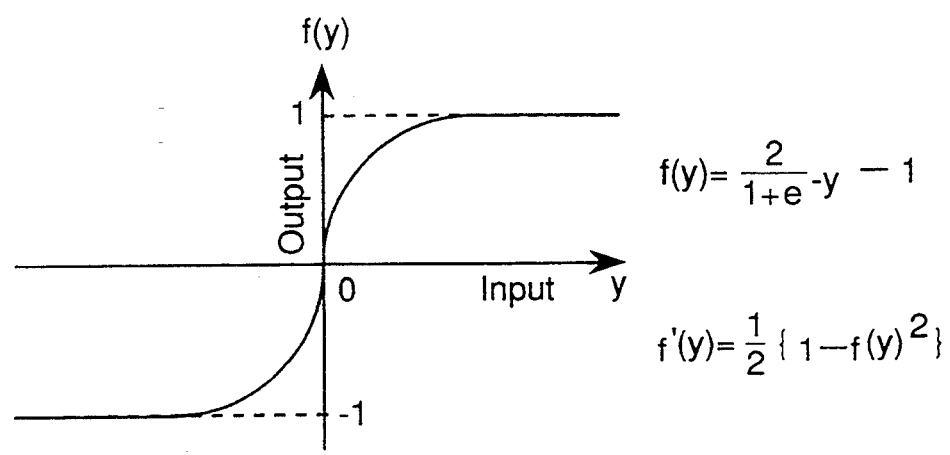
FIG. 3 is a graph describing the non-linear characteristics of the neural network units.
Figure 4:
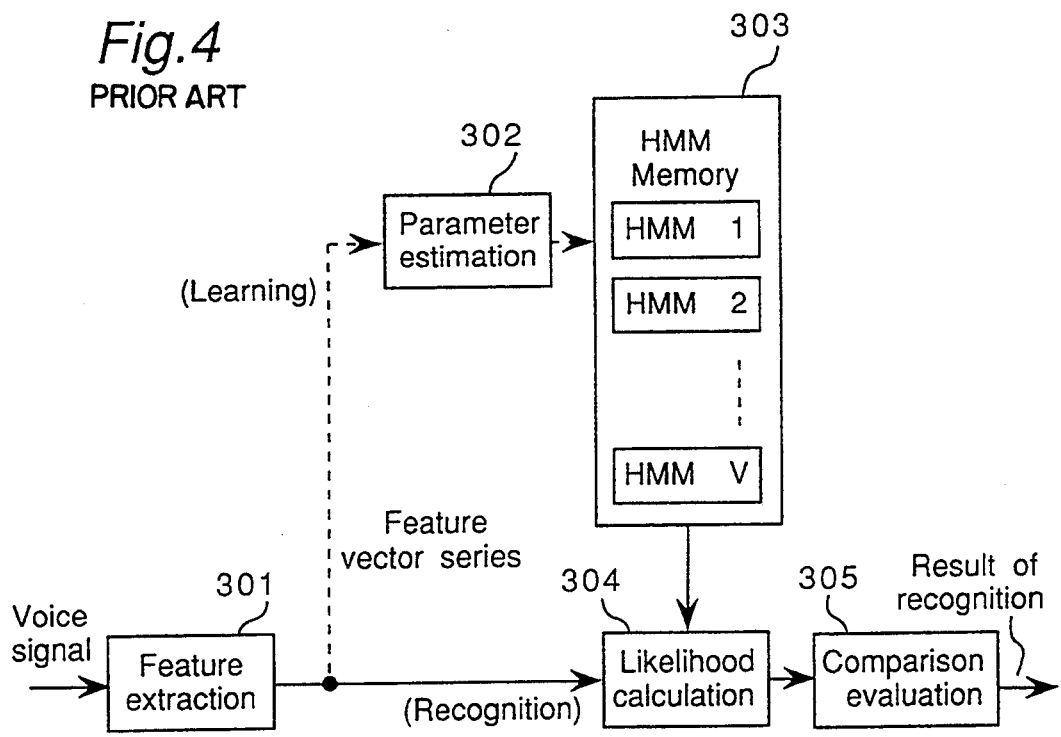
FIG. 4 is a block diagram of a conventional speech recognition device based on the Hidden Markov Model.

FIG. 4 is a block diagram of a speech recognition device using a HMM. This speech recognition device comprises a feature extraction means 301 for converting the input speech signal to feature parameter vectors at a constant time interval, called a frame, of, for example, 10 msec., by applying a filter bank, Fourier transformation, LPC analysis, or other method of common knowledge. The result is a series $Y = y(1), y(2) \ldots y(T)$ of parameter vectors for the input speech signal. The parameter estimation means 302 generates the HMM for each of the words in the recognition word vocabulary from the training data.

Specifically, to generate the HMM for a word v, the HMM structure (number of states and the number of transitional structures allowed between those states) must first be appropriately defined. The target word v is then pronounced plural times to obtain the feature parameter vector series. The probability of observation (density) of the feature vectors occurring with the transition between states and the state transition probability in the model are obtained from the feature vector series to maximize the probability of observation (density) of the feature vectors.

The HMM storage means 303 stores the HMM thus obtained for each word in the recognition vocabulary. The likelihood calculation means 304 calculates the likelihood of the feature vector series of each model stored in the HMM storage means 303 for the feature vector series of an unknown speech input to be recognized. The comparison evaluating means 305 compares the speech input with the model having the highest likelihood as determined by the likelihood calculation means 304, and outputs the corresponding word as the recognition result.

Recognition using the HMM is described below. Specifically, the probability density of the feature vector series $Y$ occurring from $\lambda^v$ for the feature vector series $Y = y(1), y(2), \ldots, y(T)$ obtained for the unknown input and any given state series $X = x(1), x(2), \ldots, x(T)$ of a length T produced by the model $\lambda^v$ is

[Precise solution]

$$L_1(v) = \sum_{x} P\{Y,X|\lambda^v\} \quad (12)$$

[Approximation]

$$L_2(v) = \max_{x}[P\{Y,X|\lambda^v\}] \quad (13)$$

By alternatively obtaining the logarithm, $$L_3(v) = \max_{x}[\log P\{Y,X|\lambda^v\}] \quad (14)$$

is obtained. In these equations, $P\{Y, X|\lambda^v\}$ is the simultaneous probability density of X and Y in the model $\lambda^v$.

Therefore, using equation (12), for example, when $$v\char`\^{} = \arg\max_{v}[L_1(v)] \quad (15)$$

the recognition result is obtained as $\hat{v}$. The same is true when equations (13) and (14) are used.

$P\{Y, X|\lambda\}$ is obtained as follows for equation (12).

When the density of the probability of observation $b_j(y)$ of the feature vector y for each state j and the probability of transition $a_{ij}$ from state i to state j are provided for state j (where $j = 1-J$) of HMM $\lambda$, the probability of simultaneous observation from the HMM $\lambda$ of state series $X = x(1), x(2), \ldots, x(T+1)$ and feature vector series $Y = y(1), y(2), \ldots, y(T)$ can be defined as $$P\{Y,X|\lambda\} = P\{Y|X,\lambda\}P\{X|\lambda\} = \prod_{t=1}^{T+1} a_{x(t-1)x(t)} \prod_{t=1}^{T} b_{x(t)}(O_t) \quad (16)$$

where $a_{x(0)x(1)}$ is the initial probability of state $x(1)$. In addition, $x(T+1) = J+1$ is the final state, the state at which transition stops after input of frame T, and no vectors occur.

In this example the feature vectors $y(t)$ of the input were used directly, but it is also possible to convert the feature vectors $y(t)$ to labels by vector quantification. In this case, the observation probability $b_j(o(t))$ in state j of label$_o(t)$ is substituted for $b_j(y(t))$ in the same state j.

The new model of the invention in which the HMM is introduced to a neural network is described below.

The neural network is used for pattern conversion of the input pattern. The input pattern can be converted into a variety of different patterns, but it is appropriate to simultaneously input plural frames for conversion to a suitable pattern if dynamic features of variable time length are to be appropriately reflected in the pattern. In other words, if $y(t-c_1), y(t-c_2), \ldots y(t-c_M)$ (where $c_m \neq 0$) are input to the input units of the neural network at time t and the value output from the pattern conversion means by passing the input through the path of the neural network corresponding to state j of the HMM is $g_j(t)$, the likelihood of this model to the input pattern Y is defined using the value $g_j(t)$.

As one such method, the pattern conversion means is constructed as a predicting means in this example. In other words, $y(t-c_1), y(t-c_2), \ldots y(t-c_M)$ (where $c_m$ is a non-zero integer, $c_1 > c_2 > \ldots c_M$, and when $c_m > 0$ forward prediction occurs, and when $c_m < 0$ backward prediction occurs) are input to the input units of the neural network at time t and the value $g_j(t)$ output from the pattern conversion means by passing the input through the path of the neural network corresponding to state j of the HMM is the predictor of $y(t)$ for state j. This yields the following benefits.

If the observation probability density of the vector $y(t)$ at time t in HMM state j is a normal distribution, the statement $$b_j(y(t)) = N(y(t); \mu_j, \Sigma_j) \quad (17)$$

is true for a standard HMM where $\mu_j$ and $\Sigma_j$ are the average vector in state j of the HMM and the variance-covariance matrix, respectively. In a standard HMM, $\mu_j$ is constant irrespective of t, and the order of $y(t)$ appearance in the self-loop of the state j does not reflect its likelihood. This is the reason for the poor ability of the standard HMM to describe the transitional changes of a time series signal.

In this embodiment, $\mu_j$ is substituted for the predictive value $g_j(t)$ of $y(t)$ for state j such that $\mu_j = \mu_j(t) = g_j(t)$. Because the tendency of changes in the feature quantities of a speech space corresponding to each state is reflected in the construction of the predictor by applying the neural network as the predicting means, the deficiencies of the HMM described above are eliminated. The weighting coefficients of the neural network can be taught by using the training signal as $y(t)$.

The predictive value of $y(t)$ output from the neural network for state j is $$y_j^\wedge(t) = \mu_j(t) = \mu_{j0} + h_j(t) \quad (18)$$

where $h_j(t)$ is generally expressed as the function $h_j(t) = h(y(t-c_1), \ldots y(t-c_M); w_j)$, and $w_j$ is the parameter set defining the function, and is the set of weighting coefficients included in path group j for the HMM state j (neural network path j).

By substituting $\mu_j(t)$ for the average vector $\mu_j$, the average vector becomes variable according to the observation state of the vectors before and after $y(t)$, thus eliminating the previously stated inability of the standard HMM. If the predictive error vector in state j is $e_j(t)$, the equation corresponding to equation (17) is $$b_j(y(t)) = N(y(t); \mu_j(t), \Sigma_j) = N(y(t) - \mu_j(t); 0, \Sigma_j) = N(e_j(t); 0, \Sigma_j) \quad (19)$$

$\mu_{0j}$ is a vector defined for each state j, is constant for the period of state j, and can be defined as part of $w_j$ but is treated here separately from $w_j$.

Figure 5A:
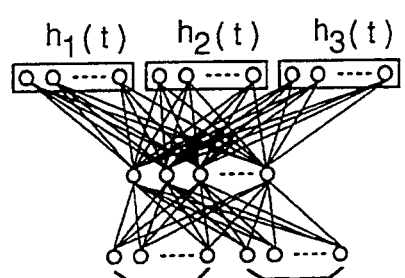
FIGS. 5(a)–5(d) show the construction of a neural network according to the first embodiment of the present invention.
Figure 5B:
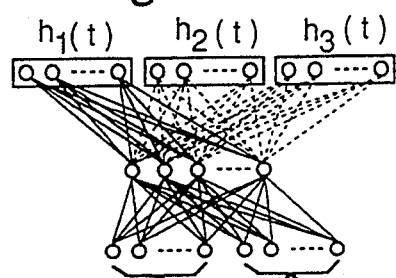
Figure 5C:
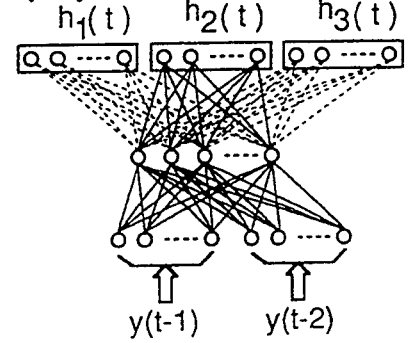
Figure 5D:
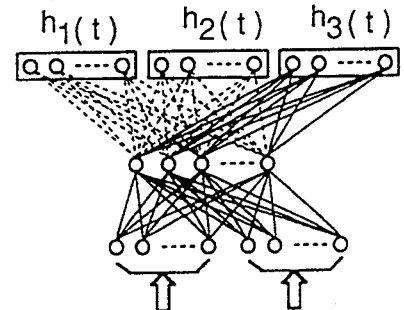
Figure 6:
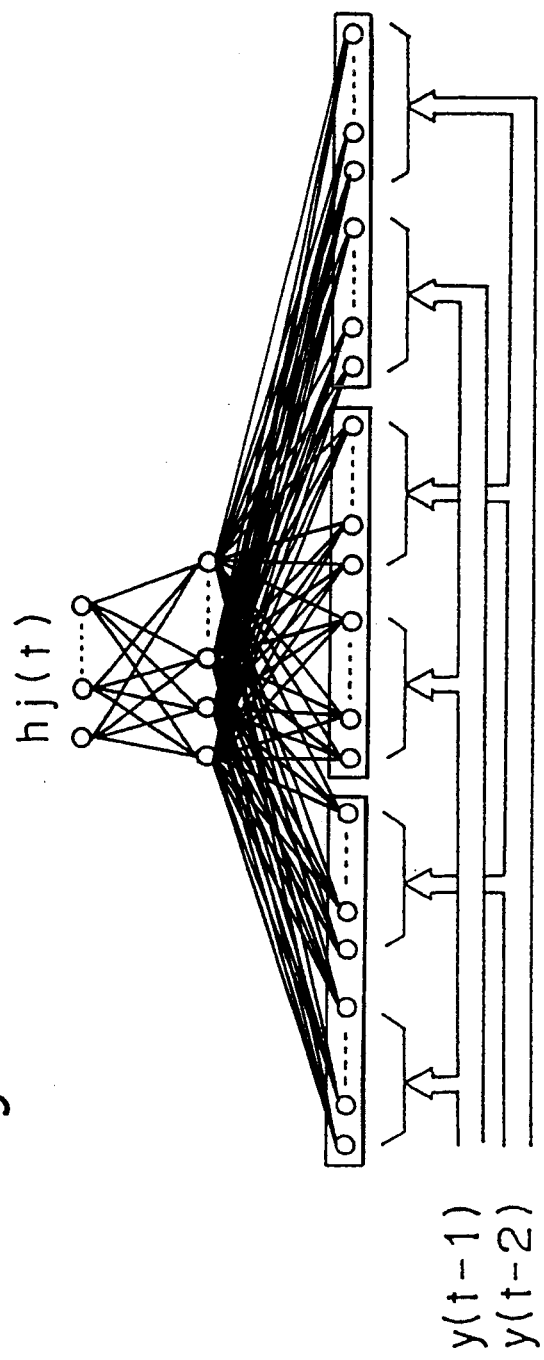
FIG. 6 shows the construction of a neural network according to an alternative embodiment of the present invention.
Figure 8D:
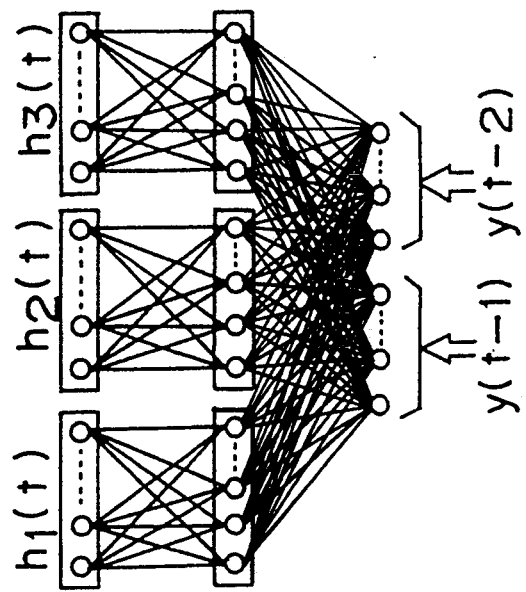
FIGS. 8(a)-8(c) show the construction of a neural network according to a further alternative embodiment of the present invention.
Figure 8C:
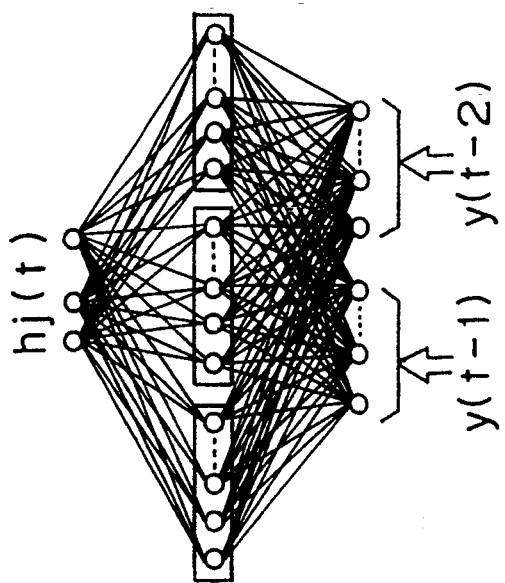
Figure 8E:
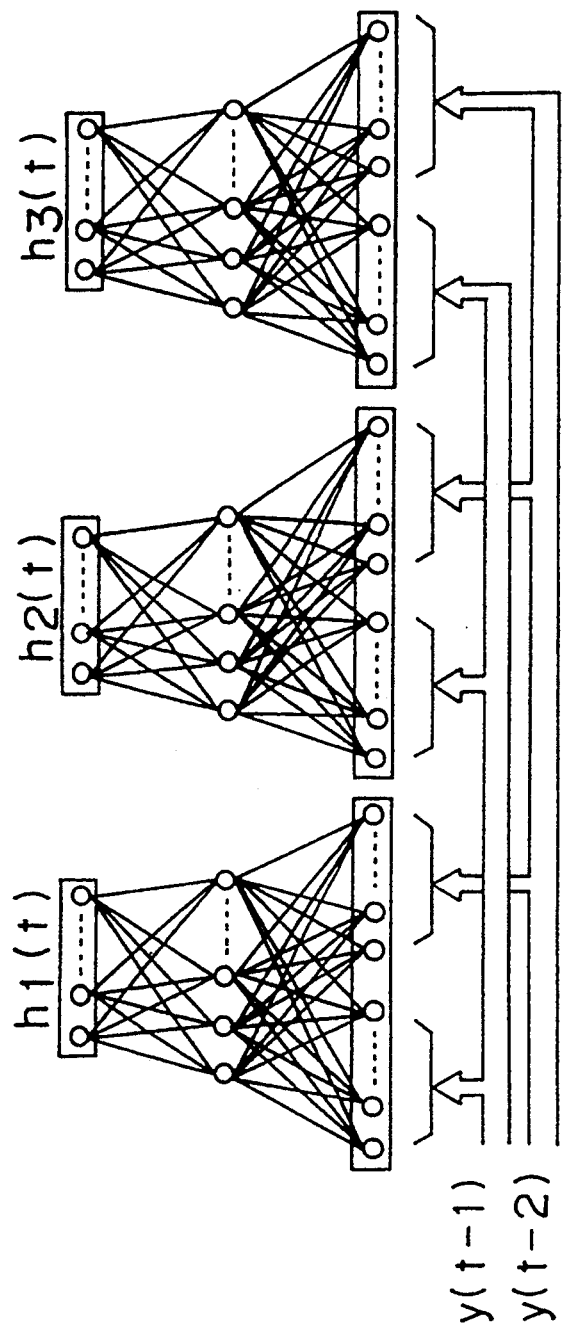

FIG. 5(a) is an example of the neural network according to the present invention. In this description $y(t)$ is to be predicted from $y(t-2)$ and $y(t-1)$, the number of states J with a HMM loop is 3 (not including the final state), the number of neural network layers is 3, the weighting coefficients of the first and second layers are shared in all states other than the final state of the HMM, and the weighting coefficients between the second and third layers are values defined specifically for each state. FIGS. 5(b), (c), and (d) correspond to HMM states 1, 2, and 3 of the neural network in FIG. 5(a), and the solid lines indicate the selection of paths in each of the states. In this example the neural network is shown with the output units corresponding to each state, but the neural network can also be constructed so that the input units correspond to each state as shown in FIG. 6, or the intermediate layers correspond to the state when four or more layers form the neural network (the paths passing through the units enclosed in a box correspond to each state). What must be noted here is that there are weighting coefficients common to each state in the constructions shown in FIGS. 5 and 6, but the paths corresponding to each state in FIGS. 8(a)-(d) are completely independent with no common weighting coefficients, and are thus equivalent to the construction shown in FIG. 8(e). FIG. 8(e) is equivalent to defining a separate neural network for each state. Because common speech is not broken into distinct periods, it is more practical to use predicting means that share some common components between states rather than to switch to a completely different predicting means every time the state changes.

FIGS. 1(f), (l), (m), and (n) show an alternative embodiment of a neural network according to the present invention. This neural network comprises three layers and has five states with an HMM loop. In this figure the unit groups of each layer are shown by rectangles, and the path groups corresponding to each HMM state are indicated by shading or masking for simplicity.

In FIGS. 1(f) and (n) the weighting coefficients between layers 2 and 3 are the same in adjacent states, and in FIGS. 1(l) and (m) the weighting coefficients between layers 2 and 3 are different in each state. In FIGS. 1(f) and (l) half of the weighting coefficients between layers 2 and 3 are the same in adjacent states, and except for both end states the weighting coefficients between layers 1 and 2 are shared in two states. In FIGS. 1(m)

and (n) there are parts in which the weighting coefficients between layers 1 and 2 are shared and are different in adjacent states.

Figure 7:
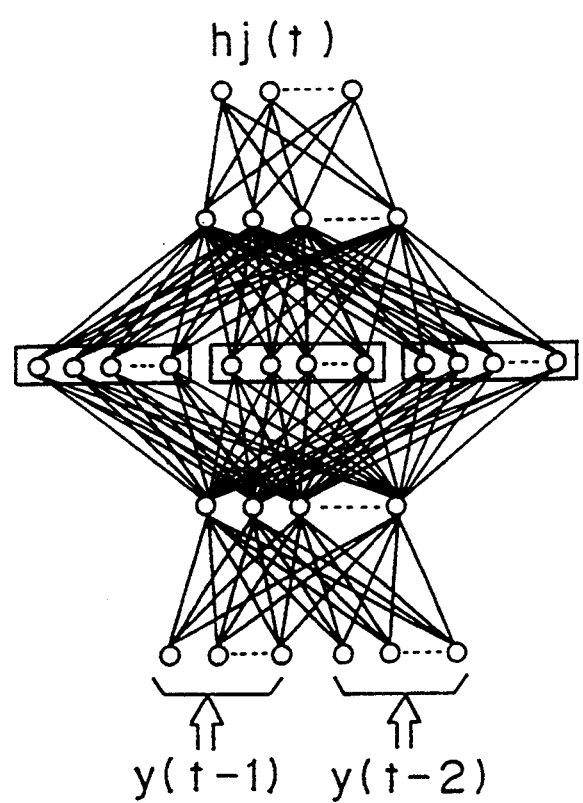
FIG. 7 shows the construction of a neural network according to a further alternative embodiment of the present invention.

FIG. 9 shows an alternative embodiment of a four-layer neural network model. In the four-layer model an even greater number of path definitions are possible between the layers, including separating the weighting coefficients between layers 2 and 3 in each state while sharing the paths between layers 1 and 2 and between layers 2 and 3, or conversely separating layers 1 and 2 and layers 2 and 3 in each state while sharing the weighting coefficients between layers 2 and 3 between states. FIGS. 7 and 9 illustrate these cases. In addition, it is also possible to comprise the neural network so that some weighting coefficients are shared by different states while other states may use completely different weighting coefficients.

Thus, the present invention can be said to enable time series signal processing by a hierarchical neural network by incorporating a Hidden Markov Model in the neural network construction. This model is therefore referred to hereinafter as the Hidden Markov driven Neural Network model (HMNN).

The general problems of the HMM are:

(1) obtaining the likelihood of HMM $\lambda$ for the observation time series pattern $\{y(t)\}$, (2) estimating the HMM parameter $\lambda^v$ for category v from plural sample (training) patterns, (3) obtaining the best state series for the HMM $\lambda$ observation time series pattern $\{y(t)\}$.

As these problems relate to the speech recognition of words, general problem (1) is related to the recognition method, and is the specific problem of obtaining which of the HMMs defined for each word has the highest probability of generating the observation (input) vector series $\{y(t)\}$. Problem (2) is the problem of generating the models for each of the words in the recognition vocabulary before application to actual speech recognition, and problem (3) is a problem that arises when the input voice breaks each phoneme, and when generating the model using the Viterbi algorithm.

Therefore, the problems that must be solved to achieve the present invention is providing a method to solve these various problems in the HMNN constructed according to the invention.

Figure 10:
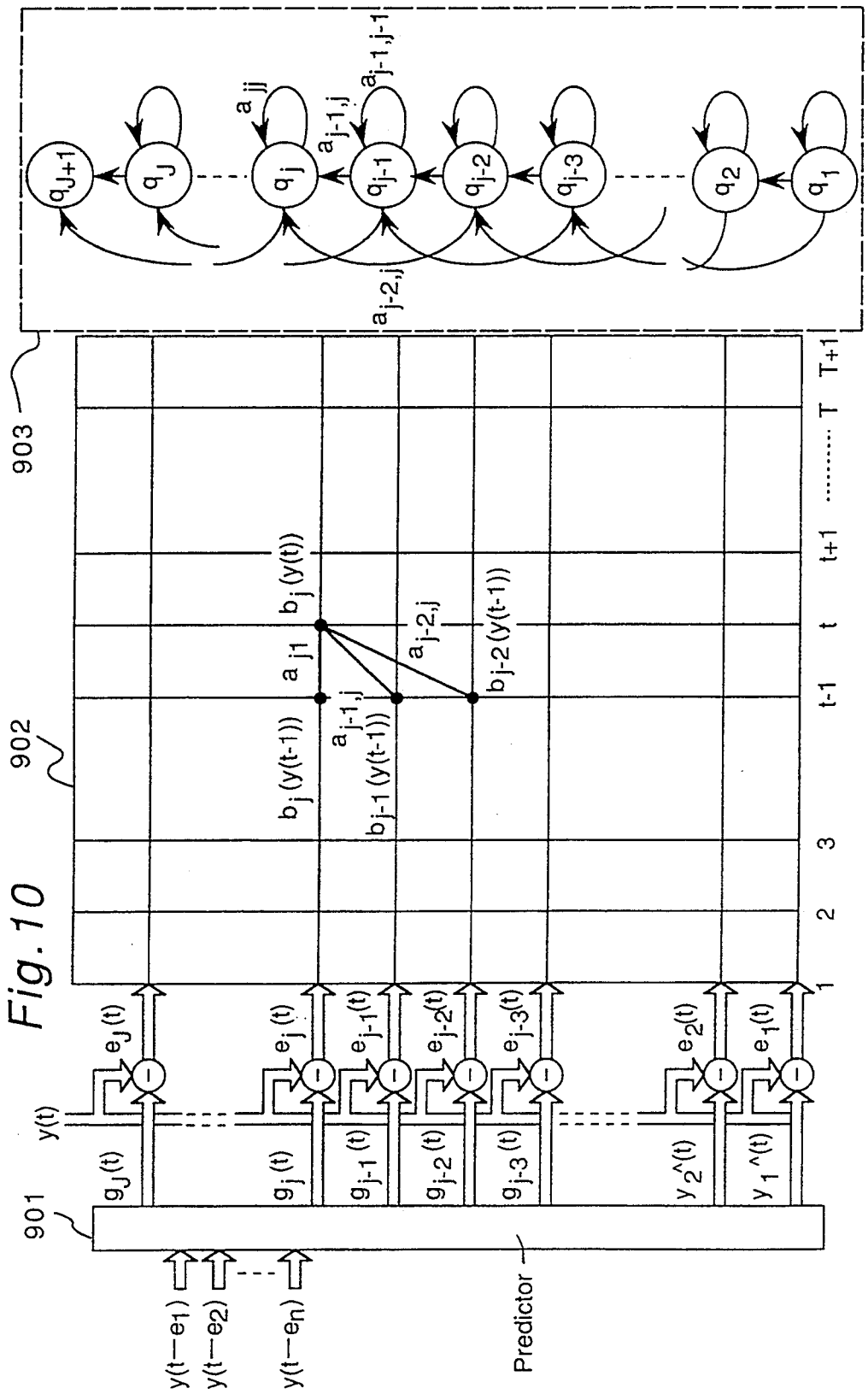
FIG. 10 is a graph illustrating the principle of the invention.

FIG. 10 illustrates the underlying principle of the invention, and is used below to describe how these problems are solved. When there are n words in the recognition vocabulary, there will be n models constructed as shown in FIG. 10. If the parameter set characterizing this model for a given word is $\lambda$, then $\lambda=(A, \{\mu_{0j}\}, \{\Sigma_j\}, w)$ where A is the transition matrix $[a_{ij}]$ of elements $a_{ij}$ at row i and column j, $\{\mu_{0j}\}, \{\Sigma_j\}$, and w are, respectively, $\{\mu_{0j}\}=\{\mu_{01}, \ldots \mu_{0J}\}$. $\{\Sigma_j\}=\{\Sigma_l, \ldots \Sigma_J\}$, and w is the set of HMNN weighting coefficients. When $w_i$ is the weighting coefficients set included in the path group for state i and $i \neq j$, there is the possibility that $w_i$ and $w_j$ share the same base.

In this embodiment the vectors $y(t-c_1), \ldots y(t-c_m), \ldots y(t-c_M)$ around the feature vector y(t) in the observation vector series $\{y(t)\}$ are input to the predicting means 901, which then outputs J predictive values for the feature vector y(t) according to the J signal paths of the neural network. The signal passing signal path j is output from the predicting means 901 as the predictive value $\mu_j(t)=g_j(t)=\mu_{j0}+h_j(t)$. If d is the number of dimensions in y(t), the output of the neural network is also in d dimensions, each component is assigned to each output terminal, and there are therefore d terminals in the output terminal group corresponding to each state.

As will be described later, however, it is possible that a different output unit will be assigned according to the state, and that an output unit group may be used in all or a selected number of plural states. This later case is illustrated in the figures as the model separated by state. The predictive value obtained from the predicting means j is obtained as the result of prediction applied for the feature vector series of the j-th frame in the observation vector series.

The grip graph 902 has the input frame number plotted on the horizontal axis, and the path groups of the predicting circuit network on the vertical axis such that grid point (t, j) on this graph represents input frame t and signal path group j of the neural network.

Each state in the Markov chain 903 corresponds to the respective signal path group in the predicting circuit network.

The first problem (1) stated above is resolved with this construction as follows.

The problem is calculating the probability $p(\lambda) = P\{X|\lambda\}P\{Y|X,\lambda\}$ of the predictive value matrix $\{y(t)\}$ from the model $\lambda$ of the invention from the observation probability $P\{X|\lambda\}$ of a path on the grid graph calculated from the transition probability of the Markov chain, and the observation probability density $P\{Y|X,\lambda\}$ of the observation vector matrix along the paths calculated from the value $b_j(y(t))$ calculated for the given grid point after defining the correlation between the input frame and the predicting circuit network output terminals under the transitional conditions defined by the Markov chain 903 when the probability of predictive error vector $e_j(t)$ for y(t) and $\mu_j(t)$ at grid point (t,j) is expressed as $b_j(y(t))$.

Expressed as a mathematical equation, this problem results in equation (20). It is to be noted that $x(T+1)=J+1$, state $J+1$ is the so-called convergence state, i.e., the state to which a transition goes but from which no transition occurs, and no vectors are observed. In addition, if the probability of observation at state j when $t=1$ is $\pi_j$, then in general $a_{x(0)x(1)}=\pi_{x(1)}$. In this invention, however, $x(1)=1$ is always satisfied, and $a_{x(0)x(1)}=1$ and $a_{x(0)x(j)}=0$ when $j \neq 1$.

$$p(\lambda) = \sum_x \left[ \prod_{t=1}^{T+1} a_{x(t-1)x(t)} \right] \left[ \prod_{t=1}^{T} b_{x(t)}(y(t)) \right] \quad (20)$$

Thus, the limiting conditions of the path corresponding to the Markov chain 903 are indicated by the bold lines on the grid graph in FIG. 10. In other words, the state one frame before state j may be j, j−1, or j−2. In the FIG. 10 graph, it will be a path passing through grid point (t,j), and the grid point one frame before (t,j) will be point (t−1,j), (t−1,j−1), or (t−1, j−2).

Equation 20 yields the precise solution, and equation (21) can be used for approximation.

$$p(\lambda) = \max_x \left[ \prod_{t=1}^{T+1} a_{x(t-1)x(t)} \right] \left[ \prod_{t=1}^{T} b_{x(t)}(y(t)) \right] \quad (21)$$

Equation (20) can compute by means of either a forward or backward algorithm. This is described below. The forward algorithm is shown first.

If $$\alpha_j(t) = P\{y(1), \ldots, y(t), x(t)=j|\lambda\} \quad (22)$$

then, $$\alpha_j(t) = \sum_i \alpha_i(t-1) a_{ij} b_j(y(t)) \quad (23)$$

In this embodiment, $$\alpha_j(t) = \sum_{i=j-2}^{j} \alpha_i(t-1) a_{ij} b_j(y(t)) \quad (24)$$

Therefore, if initialized $$\alpha_1(1) = b_1(y(1))$$

$$\alpha_j(1) = 0 \text{ for } j \neq 1$$

$$\alpha_j(t) = 0 \text{ for } j = -1, 0 \quad (25)$$

then by recursion applying equation (24) for $t=2, \ldots T$, $j=1, \ldots, J$, $$p(\lambda) = \alpha_{J-1}(T) a_{J-1,J} + \alpha_J(T) a_{J,J+1} \quad (26)$$

Calculation applying the backward algorithm is shown next.
If $$\beta_i(t) = P\{y(t+1), \ldots, y(T)|x(t)=i,\lambda\} \quad (27)$$

then, $$\beta_i(t) = \sum_j \beta_j(t+1) b_j(y(t+1)) a_{ij} \quad (28)$$

In this embodiment, $$\beta_i(t) = \sum_{j=i}^{i+2} \beta_j(t+1) b_j(y(t+1)) a_{ij} \quad (29)$$

Therefore, if initialized $$\beta_J(T) = 1$$

$$\beta_j(T) = 0 \text{ for } j \neq J$$

$$\beta_j(t) = 0 \text{ for } j = J+1, J+2 \quad (30)$$

then by recursion applying equation (29) for $t=T-1, \ldots 1, j=J, \ldots, 1$, $$p(\lambda) = \beta_1(1) b_1(y(1)) \quad (31)$$

The relationship between $\alpha_j(t)$ and $\beta_i(t)$ is defined $$p(\lambda) = \sum_{i=1}^{J} \alpha_i(t) \beta_i(t) \quad (32)$$

The approximated solution is next obtained based on equation (21). In this case the so-called Viterbi algorithm is suitable for efficient calculation using the dynamic planning method. Because it is normal to obtain the logarithm and calculate the product as a sum, this method is used in the following description.

If the logarithm is obtained for both members in equation (21), the following equation is obtained.

$$\log p(\lambda) = \max_x \left[ \sum_{t=1}^{T+1} \log a_{x(t-1)x(t)} + \sum_{t=1}^{T} \log b_{xt}(y(t)) \right] \quad (33)$$

If $$\phi_j(t) = \quad (34)$$

$$\max_{x(1),x(2),\ldots,x(t)=j} \left[ \sum_{k=1}^{t} \log a_{x(k-1)x(k)} + \sum_{k=1}^{t} \log b_{xk}(y(k)) \right]$$

the following recursion equation is formed.

$$\phi_j(t) = \max_i [\phi_i(t-1) + \log a_{ij} + \log b_j(y(t))]. \quad (35)$$

In the present embodiment in particular, $$\phi_j(t) = \max \begin{vmatrix} \phi_j(t-1) + \log a_{jj} \\ \phi_{j-1}(t-1) + \log a_{j-1,j} \\ \phi_{j-2}(t-1) + \log a_{j-2,j} \end{vmatrix} + \log b_j(y(t)) \quad (36)$$

Therefore, if initialized $$\phi_1(1) = \log b_1(y(1))$$

$$\phi_j(1) = -\infty \text{ for } j \neq 1$$

$$\phi_j(t) = -\infty \text{ for } j = -1, 0 \quad (37)$$

then by recursion applying equation (36) for $t=2, \ldots T$, $j=1, \ldots, J$, $$\log p(\lambda) = \max \begin{vmatrix} \phi_J(T) + \log a_{J,J+1} \\ \phi_{J-1}(T) + \log a_{J-1mJ+1} \end{vmatrix} = \phi_{J+1}(T+1) \quad (38)$$

Figure 11:
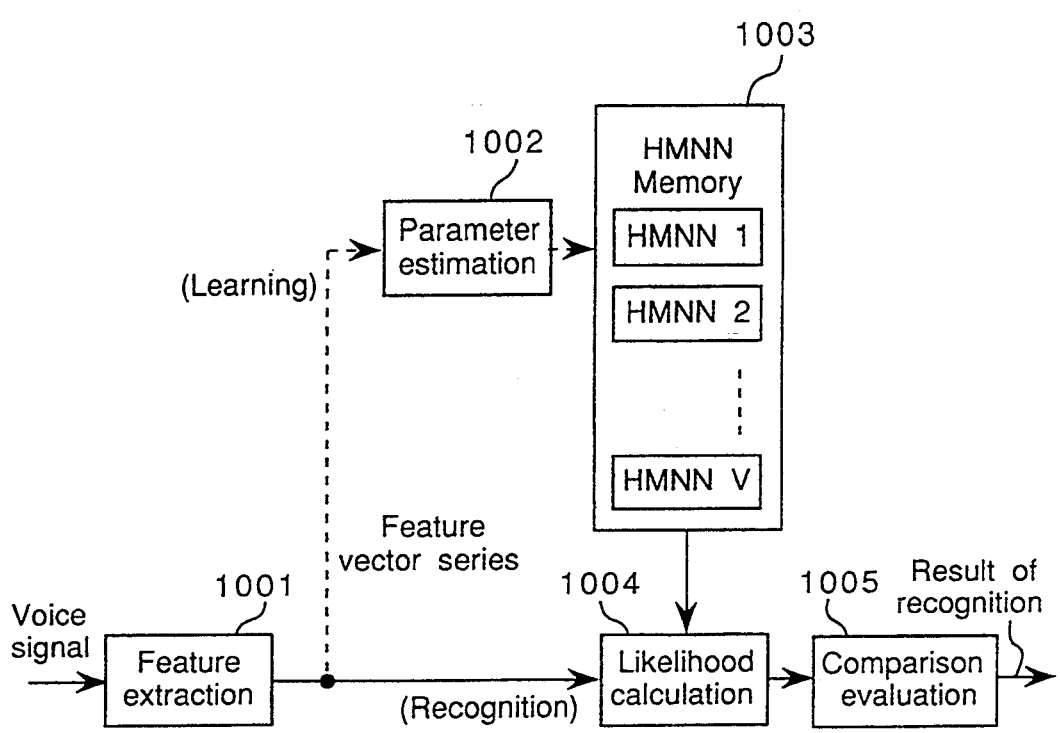
FIG. 11 is a block diagram of a speech recognition device based on the principle of the invention.

The application of the present embodiment to speech recognition based on the above principle is described below with reference to FIG. 11.

The HMNN storage means 1003 corresponds to the HMM storage means 303 in FIG. 4, and the likelihood calculation means 1004 to the likelihood calculation means 304. The HMNN v in the HMNN storage means 1003 stores the HMNN for the word v, and the likelihood calculation means 1004 calculates equations (24), (29), and (36) for the likelihood defined by equations (26), (31), and (38). Note that the feature extraction means 1101, parameter estimation means 1102, and comparison evaluating means 1105 operate the same as the corresponding feature extraction means 301, parameter estimation means 302, and comparison evaluating means 305 in FIG. 4.

The method of training the HMNN for the word v is described next. Note that this relates to the second general problem of the conventional HMM as described above.

This problem is estimating the parameter $\lambda$ that maximizes the likelihood function (probability density $P\{Y^{(1)}, Y^{(2)}, \ldots, Y^{(R)}|\lambda\}$ for the training patterns $r=1-R$ prepared for the word v. Quantities relating to the r-th training pattern are hereinafter indicated by a superscript (r).

$$P\{Y^{(1)}, \ldots, Y^{(R)}|\lambda\} = \prod_{r=1}^{R} P\{Y^{(r)}|\lambda\} = \quad (39)$$

$$\prod_{r=1}^{R} \sum_{x^{(r)}} P\{Y^{(r)}, X^{(r)}|\lambda\} = \sum_{x^{(1)}} \ldots \sum_{x^{(R)}} \prod_{k=1}^{R} P\{Y^{(k)}, X^{(k)}|\lambda\}$$

The next auxiliary function $Q(\lambda,\lambda')$ is then defined.

$$Q(\lambda, \lambda') = \quad (40)$$

$$\sum_{x^{(1)}} \ldots \sum_{x^{(R)}} \left[ \prod_{k=1}^{R} P\{Y^{(k)}, X^{(k)}|\lambda\} \right] \log \left[ \prod_{k=1}^{R} P\{Y^{(k)}, X^{(k)}|\lambda'\} \right]$$

It can therefore be concluded that if $Q(\lambda,\lambda') \geq Q(\lambda,\lambda)$, $P\{Y^{(1)}, \ldots, Y^{(r)}|\lambda'\} \geq P\{Y^1 \ldots, Y^{(1)}|\lambda\}$, and equality exists when $\lambda' = \lambda$.

$$\lambda'' = \underset{\lambda'}{\text{argmax}}[Q(\lambda, \lambda')] \quad (41)$$

can be obtained, $\lambda$ converges at the termination of $P\{Y^{(1)}, \ldots, Y^{(R)}|\lambda\}$ by iteration of equation (41) until $\lambda'' \to \lambda$, i.e., on the point yielding the maximum or saddle point of $P\{Y^{(1)}, \ldots, Y^{(R)}|\lambda\}$. The best local solution is obtained by repeating this iteration until the improvement rate in $P\{Y^{(1)}, \ldots, Y^{(R)}|\lambda\}$ drops below a predetermined threshold value.

The specific method applied is described next.

The following equation is obtained by modifying equation (40).

$$Q(\lambda, \lambda') = P\{Y^{(1)}, \ldots, Y^{(R)}|\lambda\} \sum_{r=1}^{R} \frac{1}{P\{Y^{(r)}|\lambda\}} \times \quad (42)$$

$$\sum_{x^{(r)}} P\{Y^{(r)}, X^{(r)}|\lambda\} \log P\{Y^{(r)}, X^{(r)}|\lambda'\}.$$

According to the above description, if $Q(\lambda,\lambda')$ is assumed to be a function of $\lambda'$ and the $\lambda'$ is obtained where $Q(\lambda,\lambda') > Q(\lambda,\lambda)$, $\lambda'$ will be the re-estimation of $\lambda$. If $P\{Y^{(1)}, \ldots, Y^{(R)}|\lambda\}$ is constant for $\lambda'$ and $\lambda'$ is obtained where $Q(\lambda,\lambda') > Q(\lambda,\lambda)$, this can be omitted because $P\{Y^{(1)}, \ldots, Y^{(R)}|\lambda\}$ is constant, and the following can be stated.

$$Q(\lambda, \lambda') = \sum_{r=1}^{R} C^{(r)} \sum_{x^{(r)}} P\{Y^{(r)}, X^{(r)}|\lambda\} \log P\{Y^{(r)}, X^{(r)}|\lambda'\} \quad (43)$$

where $C^{(r)} = 1P\{Y^{(r)}|\lambda\}$.

Figure 12:
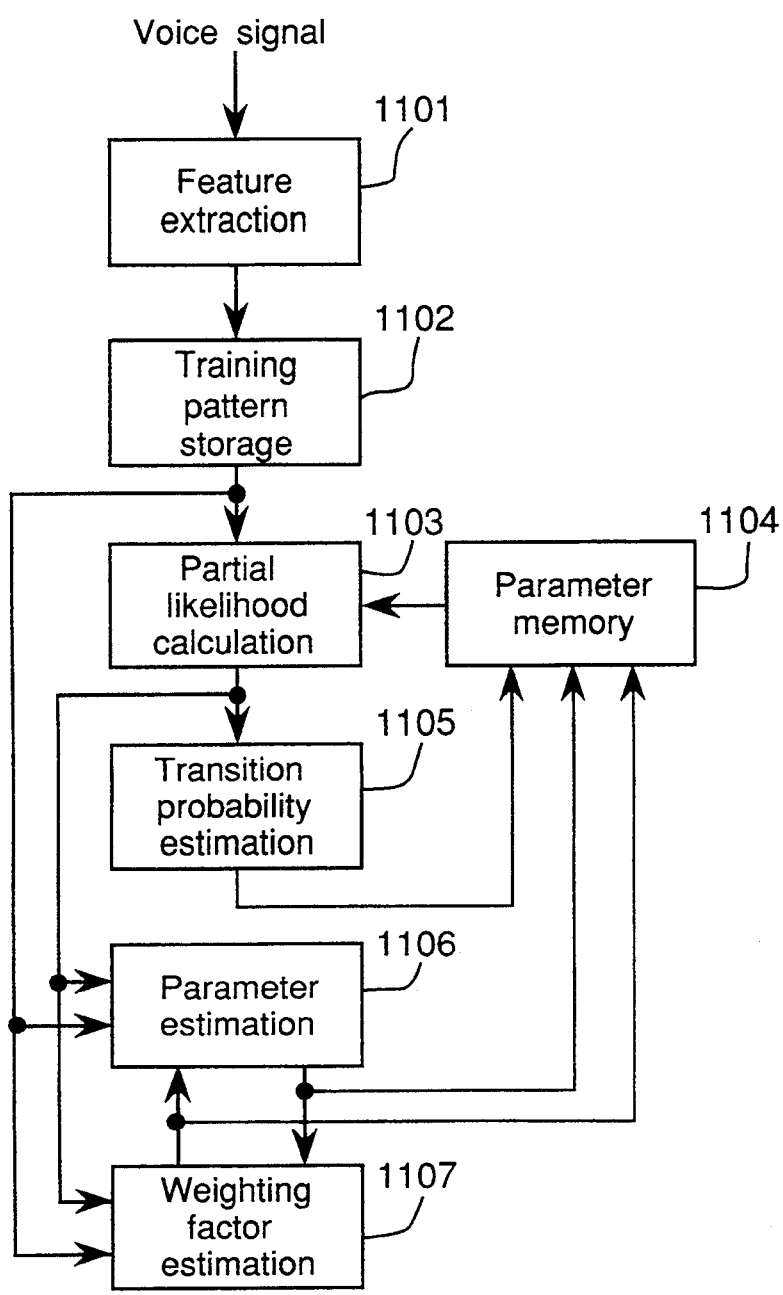
FIG. 12 is a block diagram of the first embodiment for estimating the parameters of the model according to the present invention.
Figure 13:
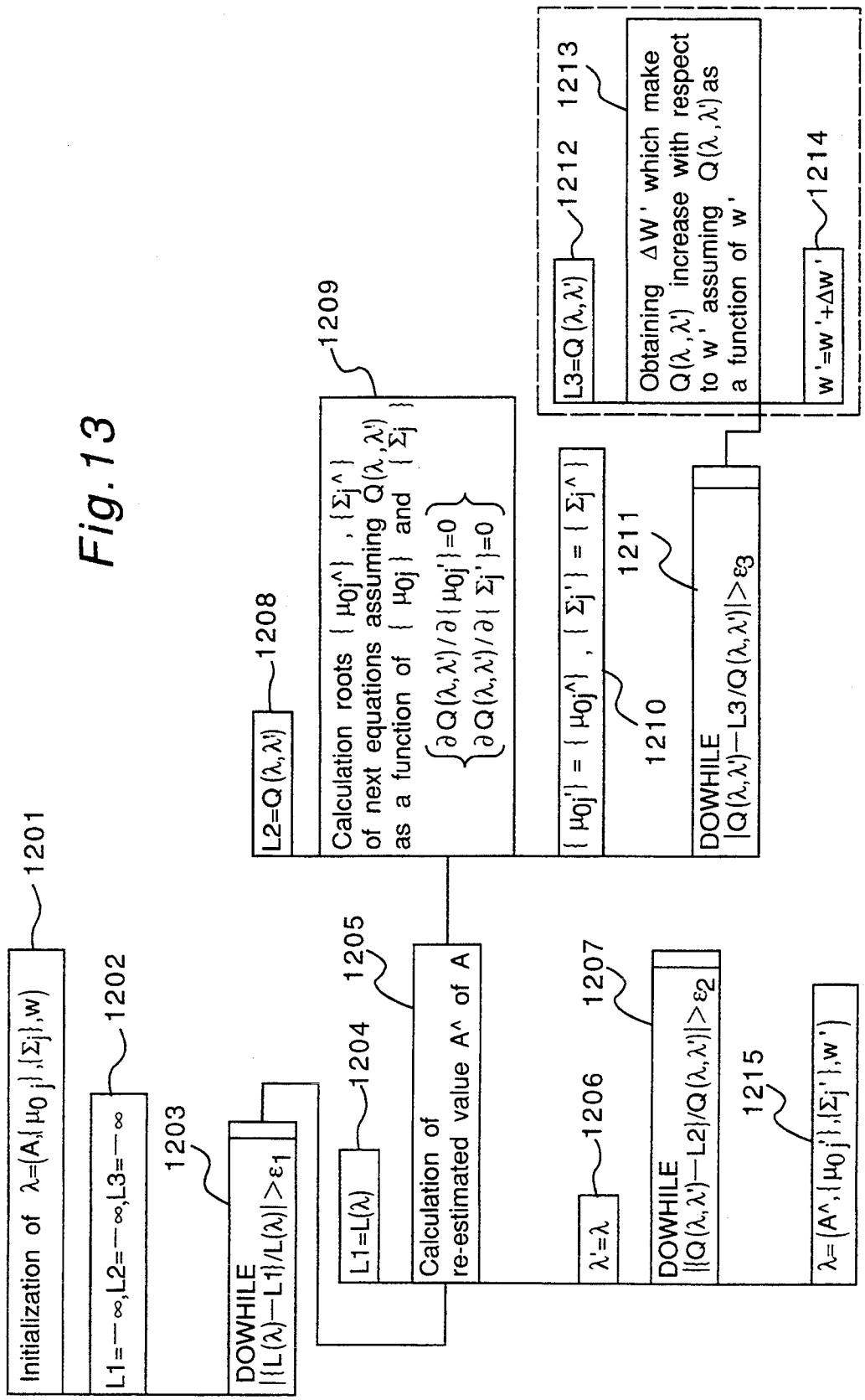
FIG. 13 is a flow chart of the operating procedure of the first embodiment.
Figure 14:
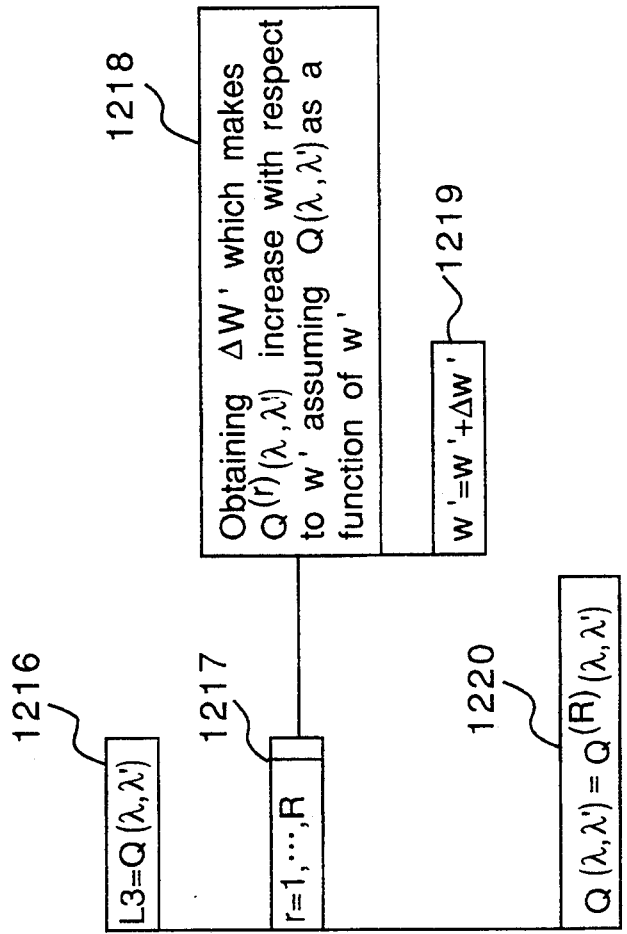
FIG. 14 is a flow chart of the operating procedure of the first embodiment.

FIG. 12 is a block diagram used to describe the first and second embodiments for parameter estimating. FIGS. 13 and 14 illustrate the processing procedure, and are used to describe the parameter estimating operation.

Parameters are estimated by performing an iterative operation from plural training patterns. A first embodiment of this parameter estimating device is shown in FIG. 12.

The feature extraction means 1101 is the same as the feature extraction means 301 shown in FIG. 4. The training pattern storage means 1102 stores the R training patterns used for estimating the HMNN parameters.

The partial likelihood calculation means 1103 calculates the various quantities used for calculating the estimated values of the parameters in the following steps.

The parameter storage means 1104 stores the re-estimated parameters at each iteration.

The transition probability estimating means 1105 calculates the re-estimated value of the transition probability $a_{ij}$ for $i=1, \ldots J$, and $J=1, \ldots, J+1$.

The probability distribution parameter estimating means 1106 calculates the re-estimated values of the parameters $\mu_{0j}$ and $\Sigma_j$ defining the shape of the probability distribution of the predictive error vector $e_j(t)$ for $i=1, \ldots J$, and $J=1, \ldots, J+1$.

The weighting coefficient estimating means 1107 calculates the re-estimated values of the weighting coefficients w for the neural network composing the model of the invention.

The re-estimated transition probability $a_{ij}$ is calculated independently of the other parameters $\mu_{0j}'$, $\Sigma_j'$, and w'.

If the re-estimated values of $\mu_{0j}$ and $\Sigma_j$ are constant relative to w', the estimating equations for $\mu_{0j}$ and $\Sigma_j$ can be obtained simultaneously.

The re-estimated value of w fixes $\mu_{0j}'$ and $\Sigma_j$, and can be calculated by applying a so-called back-propagation method known as a method of estimating the weighting coefficients of a hierarchical neural network. There are two possible back-propagation methods (described hereinafter as the first and second embodiments).

The re-estimated values of $\mu_{0j}$ and $\Sigma_j$ are obtained by solving simultaneous equations for $\mu_{0j}'$, $\Sigma_j'$, and w', but because this is analytically difficult to accomplish, estimation of $\mu_{0j}$ and $\Sigma_j$ and estimation of w is accomplished by fixing one of the parameters while estimating the other, and alternating this estimation process until predetermined convergence conditions are satisfied.

The re-estimated values thus obtained are then stored in the parameter storage means 1104 in preparation for the next iterative calculation.

Calculation of the re-estimated values for each parameter is repeated until predetermined convergence conditions are satisfied and the final estimated values are thus stored in the parameter storage means 1104. One of the convergence conditions that can be used is to calculate $L(\lambda) = \Sigma_r \{\log \alpha^{(r)}_{J+1}(T^{(r)}+1)\}$ from $\alpha^{(r)}_{J+1}(T^{(r)}+1)$ in the partial likelihood calculation means 1103, calculate the improvement rate of the iteration $L(\lambda)$ in the iterative operation, and determine the convergence conditions to be satisfied when the improvement rate is less than a predetermined threshold value.

FIGS. 13 and 14 are flow charts showing the operating procedure of the system shown in FIG. 12. This procedure can be applied when the present invention is implemented in software.

FIG. 13 is the flow chart for the first embodiment of the invention.

The procedure starts by initializing the parameter $\lambda$ at Step 1201.

At Step 1203

$$L(\lambda) = \sum_{r=1}^{R} \log P\{Y^{(r)}|\lambda\} \quad (44)$$

The improvement rate of the target function is compared with a threshold value $\epsilon_1$ in this step and in each iteration used for successive approximation of the parameters in the following steps. The result is determined to have converged to the target value when the improvement rate becomes less than or equal to the threshold value $\epsilon_1$, and the value at that time is used as the estimated value of the parameter $\lambda$. If the improvement rate is greater than $\epsilon_1$, iteration is continued.

The L1 variable is then updated to $L(\lambda)$ at Step 1204 for the Step 1203 evaluation performed in the next iteration.

The transition probability matrix A is estimated at Step 1205 (estimated value A).

At Step 1206 the values are initialized for the iterative operation applied to estimate the parameters of $\lambda'$ minus the transition probability matrix A by successive approximation. In other words, because $\zeta' = [\{\mu_{0j}'\}, \{\Sigma_j'\}, w']$ is not contained in the re-estimating equation for A, re-estimation of A is possible independently at Step 1205, but because $\{\mu_{0j}'\}, \{\Sigma_j'\}$, and $w'$ are each included in the estimation equation, they must be solved with simultaneous equations. Because this is not analytically possible, these values must also be obtained sequentially.

At Step 1207, the improvement rate of the target function $Q(\lambda,\lambda')$ is compared with a threshold value $\epsilon_2$ for $\zeta$ in this step and in each iteration used for successive approximation of the parameters in the following steps. If the improvement rate becomes less than or equal to the threshold value $\epsilon_1$, the result is determined to have converged to the target value and the value is used as the estimated value of the parameter $\zeta'$. If the improvement rate is greater than $\epsilon_2$, iteration is continued.

The L2 variable is then updated to $Q(\lambda,\lambda')$ at Step 1207 for the Step 1207 evaluation performed in the next iteration.

The estimated values of $\{\mu_{0j}'\}$ and $\{\Sigma_j'\}$ are obtained in Step 1209 by solving the simultaneous equations for $\{\mu_{0j}'\}$ and $\{\Sigma_j'\}$. At Step 1210 the result obtained in Step 1209 is substituted for $\{\mu_{j0}'\}$ and $\{\Sigma_j'\}$ in $\lambda'$.

The back-propagation operation used to estimate the weighting coefficients of the neural network is executed in Steps 1211–1214.

At Step 1211, the improvement rate of the target function $Q(\lambda,\lambda')$ is compared with a threshold value $\epsilon_3$ for $w'$ in this step and in each iteration used for successive approximation of the parameters in the following steps. If the improvement rate becomes less than or equal to the threshold value $\epsilon_3$, the result is determined to have converged to the target value and the value is used as the estimated value of the parameter $w$. If the improvement rate is greater than $\epsilon_3$, iteration is continued.

The L3 variable is then updated to $Q(\lambda,\lambda')$ at Step 1212 for the Step 1211 evaluation performed in the next iteration.

At Step 1213 $Q(\lambda,\lambda')$ is assumed to be a function of $w'$ and the value $\Delta w'$ increasing $Q(\lambda,\lambda')$ for $w'$ is obtained.

At Step 1214 $w'$ is updated to $(w' + \Delta w')$.

Finally, the entire parameter $\lambda$ is updated as $\lambda = [A, \{\mu_{0j}'\}, \{\Sigma_j'\}, w']$ in each iteration. This new parameter $\lambda$ is used to determine whether to perform another iteration based on the evaluation returned by Step 1203. If the improvement rate is less than $\epsilon_1$, the parameter $\lambda$ current at that time becomes the final estimated value.

A second embodiment of the invention is described with reference to FIG. 14. This is an alternative means of accomplishing the objectives of Steps 1212–1214 in FIG. 13. The embodiment shown in FIG. 13 corrects the weighting coefficients once all of the training patterns used for model generation are presented, but the embodiment shown in FIG. 14 corrects the weighting coefficients once each time one of the training patterns used for model generation is presented. Thus, correction of the weighting coefficients in FIG. 13 always occurs in the direction in which $Q(\lambda,\lambda')$ is increased. This is not necessarily the case in the embodiment shown in FIG. 14, and there is only a probabilistic final increase in $Q(\lambda,\lambda')$. Thus, if $$Q^{(r)}(\lambda, \lambda') = \sum_{x^{(r)}} P\{Y^{(r)}, X^{(r)}|\lambda\} \log P\{Y^{(r)}, X^{(r)}|\lambda'\} \quad (45)$$

the procedure for estimating the parameters is as follows. Note that the following relationship exists between $Q(\lambda,\lambda')$ and $Q^{(r)}(\lambda,\lambda')$.

$$Q(\lambda, \lambda') = \frac{1}{P\{Y^{(1)}, \ldots, Y^{(R)}|\lambda'\}} \sum_{r=1}^{R} C^{(r)} Q^{(r)}(\lambda, \lambda') \quad (46)$$

Step 1216 performs the same operation for the same objectives as Step 1212.

Step 1217 controls the sequential presentation of the training patterns.

At Step 1218 it is assumed that $Q^{(r)}(\lambda\lambda')$ is a function of $w'$, and the $\Delta w'$ increasing $Q^{(r)}(\lambda,\lambda')$ with respect to $w'$ is obtained.

$w'$ is then updated at Step 1219.

At Step 1220 ($Q^{(r)}(\lambda,\lambda')$ is substituted for $Q(\lambda,\lambda')$ so that it can be determined at Step 1211 whether to perform another iteration for $r = 1, \ldots R$.

The specific calculations performed in each of the above steps are described next.

Equation (43) is restated as follows.

$$Q(\lambda, \lambda') = \sum_{r=1}^{R} C^{(r)} \sum_{x^{(r)}} P\{Y^{(r)}, X^{(r)}|\lambda\} \times \quad (47)$$

$$\left[ \sum_{t=1}^{T^{(r)}+1} \log a_{x^{(r)}(t-1)x^{(r)}(t)}' + \sum_{t=1}^{T^{(r)}} b_{x^{(r)}(t)}(y^{(r)}(t))' \right]$$

where if $$Q_a(\lambda, \lambda') = \sum_{r=1}^{R} C^{(r)} \sum_{x^{(r)}} P\{Y^{(r)}, X^{(r)}|\lambda\} \sum_{t=1}^{T^{(r)}+1} \log a_{x^{(r)}(t-1)x^{(r)}(t)}' \quad (48)$$

$$Q_b(\lambda, \lambda') = \sum_{r=1}^{R} C^{(r)} \sum_{x^{(r)}} P\{Y^{(r)}, X^{(r)}|\lambda\} \sum_{t=1}^{T^{(r)}} \log b_{x^{(r)}(t)}(y^{(r)}(t))' \quad (49)$$

the following statements can be made.

$$Q_a(\lambda,\lambda') = \sum_{r=1}^{R} C^{(r)} \sum_{x^{(r)}} P\{Y^{(r)},X^{(r)}|\lambda\} \times \quad (50)$$

$$\sum_{i=1}^{J+1} \sum_{j=1}^{J+1} \sum_{t=1}^{T^{(r)}+1} \log a_{ij}' \delta(x^{(r)}(t-1),i)\delta(x^{(r)}(t),j) =$$

$$\sum_{r} C^{(r)} \sum_{i} \sum_{j} \sum_{x^{(r)}} P\{Y^{(r)},x^{(r)}|\lambda\} \times$$

-continued $$\sum_t \log a_{ij}\delta(x^{(r)}(t-1),i)\delta(x^{(r)}(t),j) = \sum_r C^{(r)} \sum_i \sum_j \sum_t \xi^{(r)}_{ij}(t)\log a_{ij}$$

$$Q_b(\lambda,\lambda') = \sum_r C^{(r)} \sum_{x^{(r)}} P\{Y^{(r)},X^{(r)}|\lambda\} \times \quad (51)$$

$$\sum_j \sum_t \log b_j(y^{(r)}(t))'\delta(x^{(r)}(t)-j) =$$

$$\sum_r C^{(r)} \sum_j \sum_{x^{(r)}} P\{Y^{(r)},x^{(r)}|\lambda\} \times \sum_t \log b_j(y^{(r)}(t))'\delta(x^{(r)}(t)-j) =$$

$$\sum_r C^{(r)} \sum_j \sum_t \gamma^{(r)}_j(t)\log b_j(y^{(r)}(t))'$$

However, $$\xi^{(r)}_{ij}(t) = P\{Y,x^{(r)}(t-1) = i, x^{(r)}(t) = j|\lambda\}, \quad (52)$$

$$\gamma^{(r)}(t) = P\{Y^{(r)},X^{(r)}(t) = j|\lambda\} = \sum_i \xi^{(r)}_{ij}(t),$$

$$\delta(m,n) = \begin{cases} 1 & \text{for } m = n \\ 0 & \text{for } m \neq n. \end{cases}$$

Estimating the transition probability $a_{ij}$ $$\frac{\partial Q(\lambda,\lambda')}{\partial a_{ij}} = \sum_{r=1}^{R} C^{(r)} \sum_{t=1}^{T^{(r)}+1} \xi^{(r)}_{ij}(t) \frac{1}{a_{ij}} \quad (53)$$

Using equation (53) and Lagrange's indeterminate multiplier method, $$\sum_{j=1}^{J+1} a_{ij} = 1 \quad (54)$$

Thus, $$O = \frac{\partial}{\partial a_{ij}} \left[ Q(\lambda,\lambda') - \theta \sum_{k=1}^{J+1} a_{ik} \right] = \quad (55)$$

$$\sum_{r=1}^{R} C^{(r)} \sum_{t=1}^{T^{(r)}+1} \xi^{(r)}_{ij}(t) \frac{1}{a_{ij}} - \theta$$

and by multiplying both members by $a_{ij}'$ and obtaining the sum for $j=1-J+1$, $$\theta = \sum_{r=1}^{R} C^{(r)} \sum_{t=1}^{T^{(r)}+1} \sum_{j=1}^{J+1} \xi^{(r)}_{ij}(t) \quad (56)$$

In addition, the re-estimated value of $a_{ij}$ is $$\overline{a_{ij}} = \frac{\sum_{r=1}^{R} C^{(r)} \sum_{t=1}^{T^{(r)}+1} \xi^{(r)}_{ij}(t)}{\sum_{r=1}^{R} C^{(r)} \sum_{t=1}^{T^{(r)}+1} \sum_{j=1}^{J+1} \xi^{(r)}_{ij}(t)} \quad (57)$$

$$\xi^{(r)}_{ij}(t) = P\{Y^{(r)},x^{(r)}(t-1) = i, X^{(r)}(t) = j|\lambda\} = \quad (58)$$

$$\alpha^{(r)}(t-1,i)a_{ij}b_j(x^{(r)}(t))\beta^{(r)}(t+1,j).$$

Thus, equation (58) can be solved if initialization values appropriate to the parameter $\lambda$ are given for $\alpha$ and $\beta$, and if $\alpha^{(r)}_j(t)$ and $\beta^{(r)}_j(t)$ are sequentially calculated using recursion according to equation (23) for $t=2-T^{(r)}$, $j=1-J$ and equation (28) for $t=T^{(r)}-1-1$, $i=J-1$, respectively.

Estimating the $b_j(y)$ parameter

In the conventional HMM, $b_j(y)$ is normally defined as a probability density of the feature vector y in state j.

The present invention is a HMM characterized by a neural network which outputs to the unit group corresponding to each state a predictive value for a given feature vector y(t) at time t in the input speech signal. The predictive value $\mu_j(t)$ is obtained at the output of the unit group corresponding to state j, and $b_j(y(t))$ is the probability density of the prediction error $e_j(t-) = y(t) - \mu_j(t)$ of the predictive value $\mu_j(t)$. Thus, from equation (51) the solution $$O = \frac{\partial Q(\lambda,\lambda')}{\partial \zeta'} = \sum_{r=1}^{R} C^{(r)} \sum_{j=1}^{J} \sum_{t=1}^{T^{(r)}+1} \gamma^{(r)}_j(t) \frac{\partial}{\partial \zeta'} \log b_j(y^{(r)}(t))' \quad (59)$$

is obtained.

For example, if y(t) is predicted from $y(t-c_1)$, $y(t-c_2), \ldots, y(t-c_M)$ (where $C_k$ is a non-zero integer), the prediction error is provided as a normal distribution, and if the number of y(t) dimensions is d, $$b_j(y(t)) = \left[ \frac{1}{2\pi} \right]^{d/2} |\Sigma_j^{-1}|^{\frac{1}{2}} \exp\left[ -\frac{1}{2} e_j(t)^* \Sigma_j^{-1} e_j(t) \right] \quad (60)$$

In other words, from $$\log b_j(y(t)) = \frac{d}{2} \log \frac{1}{2\pi} + \frac{1}{2} \log|\Sigma_j^{-1}| - \frac{1}{2} e_j(t)^* \Sigma_j^{-1} e_j(t) \quad (61)$$

the following re-estimating equations can be formed.

(a) Estimating $\mu_{j0}$ $$\frac{\partial \log b_j(y(t))}{\partial \mu_{j0}} = e_j(t)^* \Sigma_j^{-1} = [y(t) - \{\mu_{j0} + h_j(t)\}]^* \Sigma_j^{-1} \quad (62)$$

the re-estimating equation for $\mu_{j0}$ is $$\overline{\mu_{j0}} = \frac{\sum_r C^{(r)} \sum_t \gamma^{(r)}_j(t)\{y^{(r)}(t) - h^{(r)}_j(t)\}}{\sum_r C^{(r)} \sum_t \gamma^{(r)}_j(t)} \quad (63)$$

because $\partial Q(\lambda,\lambda')/\partial \mu_{j0}' = 0$.

(b) Estimating the variance-covariance matrix $\Sigma_j$ $$\overline{\Sigma_j} = \frac{\sum_r C^{(r)} \sum_t \gamma^{(r)}_j(t) e^{(r)}_j(t)' e^{(r)}_j(t)^*}{\sum_r C^{(r)} \sum_t \gamma^{(r)}_j(t)} \quad (64)$$

(c) Estimating the weighting coefficient w

When steps 1211-1214 are used, the weighting coefficients w are estimated as follows.

When an independent predicting means is used for each state, the re-estimated value of the weighting coefficient w in state j can be obtained by applying a reverse error propagation method where $w_j'$ maximizes $Q(\lambda,\lambda')$ each state j, and $w_j$ is the weighting coefficient set in state j. This is a non-linear programming problem in which $Q(\lambda\lambda')$ is the target function. By repeating the operation of defining the correction quantity $\Delta w_j'$ by some method and obtaining $w_j' = w_j' + \Delta w_j'$ when the weighting coefficient in the n-th iteration is $w_j'$, the required re-estimated value $w_j'$ can be obtained.

Various methods developed in non-linear programming problems can be used to calculate $\Delta w_j'$, but the simplest method is $$\Delta w_j' = \epsilon \frac{\partial Q(\lambda,\lambda')}{\partial w_j'} \tag{65}$$

where $\epsilon$ is a selected suitably small integer.

In the HMNN independent predicting means are not used for each state, but share weighting coefficients between states. Therefore, $\Delta w_j'$ is not independently obtained, but simultaneously across all path groups associated with the weighting coefficient to be estimated.

The following quantities must first be defined.

$w^{u-1}{}_{mn}$: weighting coefficient along the path from the unit m in layer u−1 to unit n in layer u $i^{(r)\mu}{}_n(t)$: input to layer u unit n at time t when path group j is selected in the observation series $Y^{(r)}$ $o^{(r)\mu}{}_m(t)$: output from layer u unit m at time t when path group j is selected in the observation series $Y^{(r)}$ $z^{(r)\mu}{}_n(t)$: $z_j{}^u{}_n(t) = \partial h^{(r)\mu}{}_n(t)$: $z^{(r)\mu}{}_n(t) = \partial h^{(r)}{}_j(t)/\partial i^{(r)\mu}{}_n(t)$ (in a d dimension vector)

$S^u{}_{mn}$: set of path groups sharing the weighting coefficient $w^u{}_{mn}q^{(r)\mu}{}_m(t)$: $q^{(r)\mu}{}_m(t) = \partial o^{(r)\mu}{}_m(t)/\partial i^{(r)\mu}{}_n(t)$.

If the input/output characteristics of each unit are $f(\theta) = 2/\{1 + \exp(-\theta)\} - 1$, $$q^{(r)\mu}{}_m(t) = \frac{1}{2}\{1 - o^{(r)\mu}{}_m(t)^2\} \tag{66}$$

If the equations corresponding to equation (65) are written for each element, $$\Delta w^{u-1}{}_{mn}' = \frac{\partial Q(\lambda,\lambda')}{\partial w^{u-1}{}_{mn}'} \tag{67}$$

$$\frac{\partial Q(\lambda,\lambda')}{\partial w^{u-1}{}_{mn}'} = \sum_{j \in S^{u-1}{}_{mn}} \sum_r \sum_t \gamma^{(r)}{}_i(t) \frac{\partial}{\partial w^{u-1}{}_{mn}'} \log b_j(y^r(t))' = \tag{68}$$

$$\sum_{j \in S^{u-1}{}_{mn}} \sum_r \sum_t \gamma^{(r)}{}_i(t) e^{(r)}{}_j(t)^* \Sigma_j{}'^{-1} \frac{\partial h^{(r)}{}_j(t)'}{\partial w^{u-1}{}_{mn}'}$$

and $$\frac{\partial h^{(r)}{}_j(t)'}{\partial w^{u-1}{}_{mn}'} = \frac{\partial h^{(r)}{}_j(t)'}{\partial i^{(r)\mu}{}_n(t)'} \frac{\partial i^{(r)\mu}{}_n(t)'}{\partial w^{u-1}{}_{mn}'} = \tag{69}$$

$$\frac{\partial h^{(r)}{}_j(t)'}{\partial i^{(r)\mu}{}_n(t)'} o^{(r)\mu-1}{}_m(t)' = z^{(r)\mu}{}_n(t)' o^{(r)\mu-1}{}_m(t)'$$

the following equation can be obtained by substituting equation (73) for equation (72).

$$\frac{\partial Q(\lambda,\lambda')}{\partial w^{u-1}{}_{mn}'} = \tag{70}$$

$$\sum_{j \in S^{u-1}{}_{mn}} \sum_r \sum_t \gamma^{(r)}{}_j(t) z^{(r)\mu}{}_n(t)^* \Sigma_j{}'^{-1} e^{(r)}{}_j(t)' \times o^{(r)\mu-1}{}_m(t)'$$

Equations (72), (74), and (75) can also be stated for $z^{(r)\mu}{}_n(t)$ where U is the last layer.
When $u \neq U$:

$$\frac{\partial h^{(r)}{}_j(t)'}{\partial i^{(r)\mu}{}_n(t)'} = \sum_k \frac{\partial h^{(r)}{}_j(t)'}{\partial i^{(r)\mu+1}{}_k(t)'} \frac{\partial i^{(r)\mu+1}{}_k(t)'}{\partial o^{r\mu}{}_j(t)'} \frac{\partial o^{(r)\mu}{}_n(t)'}{\partial i^{(r)\mu}{}_n(t)'} \tag{71}$$

from which $$z^{((r)\mu n}(t)' = \sum_k z^{(r)\mu+1k}(t)' W^{unk'} q^{(r)\mu n}(t)' \tag{72}$$

When u=U:

When the output units are shared in each state as shown in FIGS. 1(l) and (m), the output of the output unit corresponding to state j is $h^{(r)}{}_j(t)$. Thus, if $h^{(r)}{}_j(t)^* = (h^{(r)}{}_{j1}(t), \ldots, {}^{(r)}{}_{jd}(t))$, $$q^{(r)jun}(t) = \frac{1}{2}\{1 - h^{(r)}{}_{jn}(t)^2\} \tag{73}$$

and $$z^{((r)jun}(t) = \frac{\partial h^{(r)j}(t)}{\partial i^{(r)jun}(t)} = (0, \ldots, 0, q^{(r)jun}(t), 0, \ldots, 0)^* \tag{74}$$

When the unit group outputting $h^{(r)}{}_j(t)$ is different in each state as shown in FIGS. 1(f) and (n), $$z^{(r)\mu}{}_n(t) = \frac{\partial h^r{}_j(t)}{\partial i^{(r)\mu}{}_n(t)} \tag{75}$$

0 if $n \leq (j-1)d$ or $n \geq jd + 1$ $(0, \ldots, 0, q_j{}^u(j-1)d + k, 0, \ldots, 0)^*$ if $n = (j-1)d + k$ when $1 \leq k \leq d$ Thus, $\Delta w'$ can be obtained by first calculating equation (74) or equation (75) by the neural network thus constructed, and then sequentially calculating equations (72), (70), and (67) for the values $u = U, U-1, \ldots, 1$ for all possible combinations of m, n.

The forward-backward method of parameter estimation has been described thus far, but the Viterbi method can also be used to estimate the parameters more simply when there is a large volume of training data.

Figure 15:
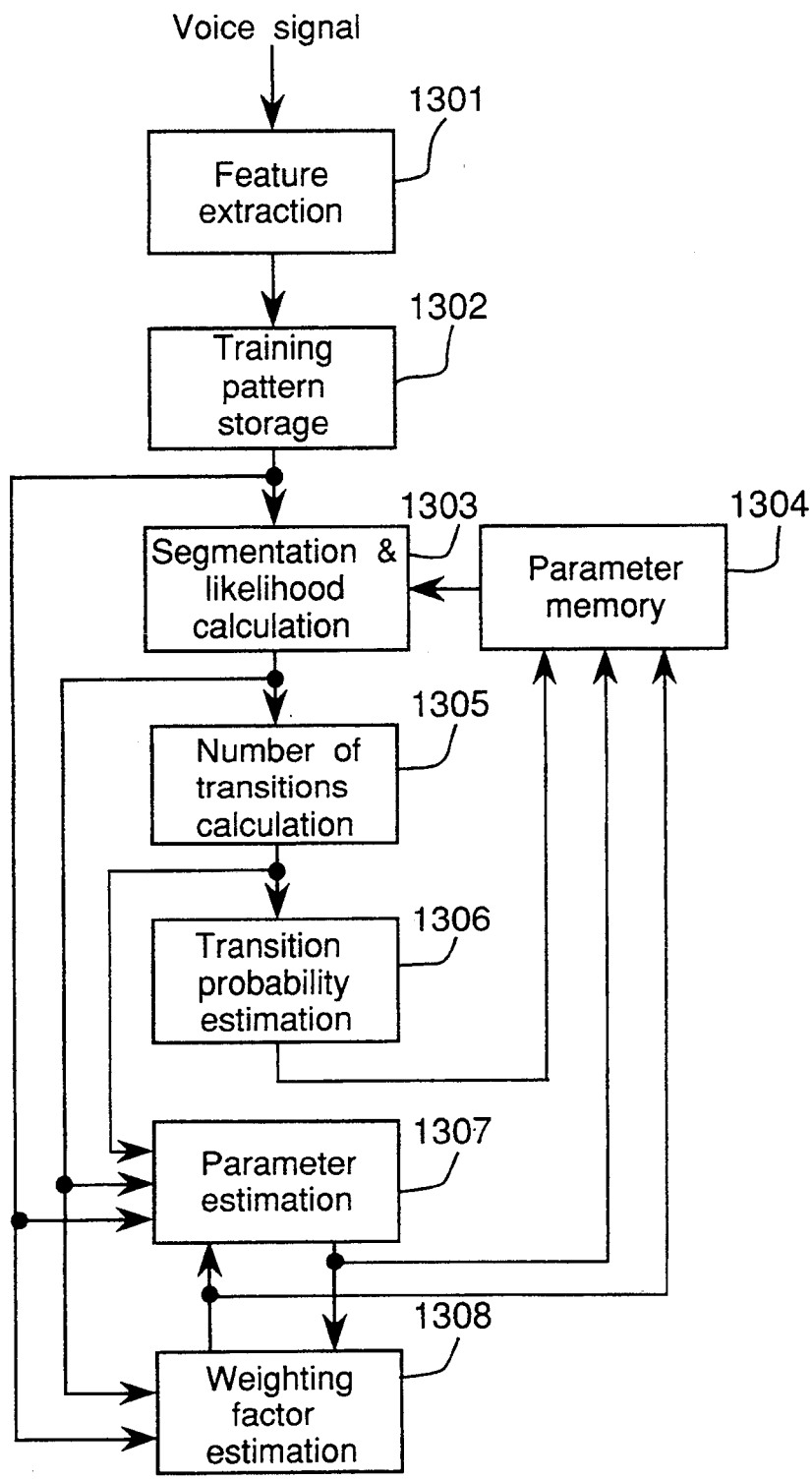
FIG. 15 is a block diagram of the second embodiment for estimating the parameters of the model according to the present invention.

FIG. 15 is a block diagram of an alternative embodiment of the invention in which the Viterbi method of parameter estimating is used. There are also two methods of back propagation that can be used with this method, and these are described below as the third and fourth embodiments of the invention.

When $X^{(r)}$ is the state series providing the greatest likelihood of $Y^{(r)}$ in model $\lambda$, $$L(\lambda) = \log \prod_{r=1}^{R} P\{Y^{(r)}, X^{*(r)}|\lambda\} = \sum_{r+1}^{R} \log P\{Y^{(r)}, X^{*(r)}|\lambda\} \tag{76}$$

is defined and the parameter $\lambda$ that maximizes $L(\lambda)$ is obtained. Equation (76) can be restated $$L(\lambda) = \tag{77}$$

$$\sum_r \left\{ \sum_{t=1}^{T^{(r)}+1} \log a_{x^{(r)}(t-1)x^{(r)}(t)} + \sum_{t=1}^{T^{(r)}} \log b_{x^{(r)}(t)}(y^{(r)}(t)) \right\}$$

Thus, if $$L_a(\lambda) = \sum_r \sum_t \log a_{x^{(r)}(t-1)x^{(r)}(t)} \quad (78)$$

$$L_b(\lambda) = \sum_r \sum_t \log b_{x^{(r)}(t)}(y^{(r)}(t))$$

then $$L_a(\lambda) = \sum_{r=1}^{R} \sum_{i=1}^{J+1} \sum_{j=1}^{J+1} \sum_{t=1}^{T^{(r)}+1} \log a_{ij} \delta(x^{(r)}(t-1),i) \delta(x^{(r)}(t),j) = \quad (79)$$

$$\sum_r \sum_t \log a_{ij} n^{(r)}_{ij}$$

$$L_b(\lambda) = \sum_{r=1}^{R} \sum_{t=1}^{T^{(r)}} \log b_{x^{(r)}(t)}(y^{(r)}(t)) = \quad (80)$$

$$\sum_{r=1}^{R} \sum_{j=1}^{J} \sum_{t=1}^{T^{(r)}} \log b_j(y^{(r)}(t)) \delta(x^{(r)}(t),j)$$

where $n^{(r)}_{ij}$ is the number of times path $X^{(r)}$ passes states i,j.

FIG. 15 is a block diagram of an embodiment of the invention for estimating the parameters in this case.

The feature extraction means 1301 and training pattern storage means 1302 are identical to the corresponding feature extraction means 1101 and training pattern storage means 1102 shown in FIG. 12.

The segmentation and likelihood calculation means 1303 calculates the recursive equation (equation (36)) based on the parameters stored in the parameter storage means 1304, calculates the log $p^{(r)}(\lambda)$ for the r-th training pattern $Y^{(r)}$ for each of the values $r=1, \ldots, R$ stored in the training pattern storage means 1302 using equation (38), and obtains the best path yielding this log $p^{(r)}(\lambda)$, i.e., the input frame corresponding to each state.

The parameter storage means 1304 stores the new parameter values after each iteration.

The transition number calculating means 1305 calculates the number of transitions $n^{(r)}_{ij}$ from state i to state j for $i=1, \ldots, J$ and $j=1, \ldots J+1$, and the number of frames $n^{(r)}_j$ corresponding to state j for each of the training patterns $r(r=1, \ldots, R)$. These are calculated from the result returned by the segmentation and likelihood calculation means 1303.

The transition probability estimating means 1306 obtains the transition probability $a_{ij}$ (where $i=1, \ldots, J$, and $j=1, \ldots, J+1$) from the result returned by the transition number calculating means 1305.

The probability distribution parameter estimating means 1307 calculates the re-estimated value of the parameters $\mu_j$, $\Sigma_j$ defining the shape of the probability distribution of the predictive error vector $e_j(t)$ for the values $i=1, \ldots, J$, and $j=1, \ldots, J+1$. These parameters are calculated using the feature vectors of each state returned by the segmentation and likelihood calculation means 1303, and the number of transitions $n^{(r)}_j$ returned by the transition number calculating means 1305.

The weighting coefficient estimating means 1308 calculates the re-estimated values of the weighting coefficients w of the neural network forming the model of this invention. This calculation is performed using the feature vectors of each state returned by the segmentation and likelihood calculation means 1303, and the number of transitions $n^{(r)}_j$ returned by the transition number calculating means 1305.

The following statements are true both for this method and for the forward-backward method described above.

The re-estimated value of the transition probability $a_{ij}$ can be calculated independently of the other parameters $\mu_{0j}'$, $\Sigma_j'$, and w'.

The re-estimated values of $\mu_{0j}$ and $\Sigma_j$ can be obtained as simultaneous equations of the estimating equations for $\mu_{0j}$ and $\Sigma_j$ if w' is constant.

The re-estimated value of w' can be obtained from a known back-propagation method used to estimate the weighting coefficients of a hierarchical neural network if $\mu_{0j}$ and $\Sigma_j$ are constant. There are two back-propagation methods that can be applied (these are described later).

In fact, the re-estimated values of $\mu_{0j}$, $\Sigma_j$, and w can be obtained by solving simultaneous equations for $\mu_{0j}'$, $\Sigma_j'$, and w', but the values $[\mu_{0j}, \Sigma_j]$ and $[w]$ are estimated in alternating loops by fixing the parameter(s) not being estimated in the current loop until specific predetermined convergence conditions are satisfied.

The obtained re-estimated values are then stored in the parameter storage means 1304 for use in the next iteration.

Calculation of the re-estimated values of each parameter is thus repeated until specific predetermined convergence conditions are satisfied, and the final estimated value is thus stored in the parameter storage means 1304 when those conditions are met and the loop is terminated. One of the many possible convergence conditions is to subtract $L(\lambda) = \sum_r \phi^{(r)}_{J+1}(T^{(r)}+1)$ from $\phi^{(r)}_{J+1}(T^{(r)}+1)$ in the segmentation and likelihood calculation means 1303, calculate the improvement rate in $L(\lambda)$ from the previous iteration, and determine convergence of the calculation to the target when this improvement rate is less than a predetermined threshold value.

Figure 16:
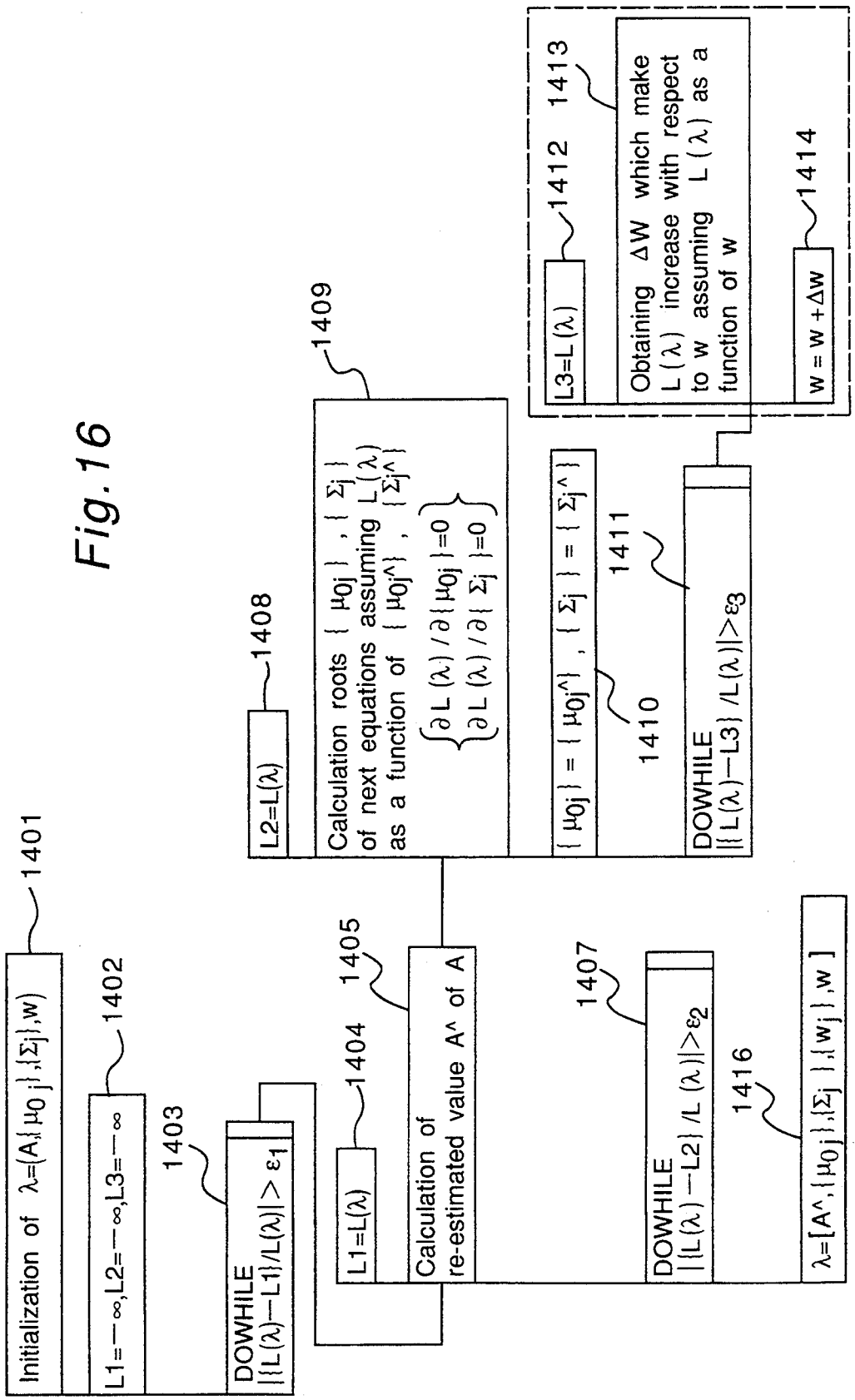
FIG. 16 is a flow chart of the operating procedure of the second embodiment.
Figure 17:
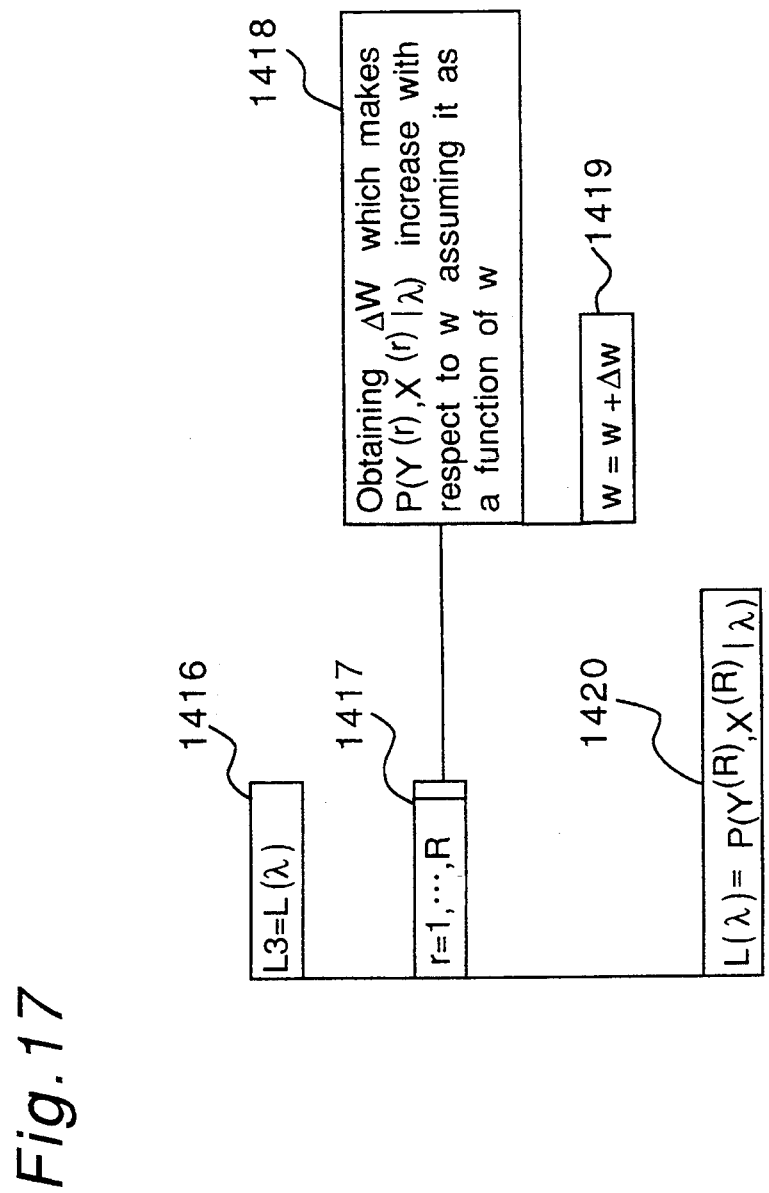
FIG. 17 is a flow chart of the operating procedure of the second embodiment.

The specific steps of this parameter estimating process are shown in the flow diagrams of FIGS. 16 and 17. As with the forward-backward method, there are two ways the weighting coefficients can be estimated. These methods incorporated into the Viterbi method are thus the third and fourth embodiments of the invention as shown in FIGS. 16 and 17, respectively. These procedures can be applied when the present invention is implemented in software.

In FIGS. 16 and 17 the value $L(\lambda)$ is the value $Q(\lambda,\lambda')$ shown in FIG. 13.

The third embodiment is described next with reference to FIG. 16.

Re-estimating the transition probability $a_{ij}$ $$0 = \frac{\partial}{\partial a_{ij}} \left\{ L_a(\lambda) - \theta \left( \sum_{k=1}^{J+1} a_{ik} - 1 \right) \right\} = \frac{1}{a_{ij}} \sum_r n^r{}_{ij} - \theta \quad (81)$$

Multiplying both members by $a_{ij}$ and obtaining the sum, $$\theta = \sum_r n^{(r)}_i \quad (82)$$

where $n^{(r)}_i$ is the number of times path $X^{(r)}$ passes state i and $$n^{(r)}_i = \sum_j n^{(r)}_{ij} \tag{83}$$

By substituting equation (82) in equation (81), the re-estimated value $\overline{a_{ij}}$ of $a_{ij}$ can be obtained as $$\overline{a_{ij}} = \frac{\sum_r n^{(r)}_{ij}}{\sum_r n^{(r)}_i{}^*} \tag{84}$$

From equation (80), we obtain $$\frac{\partial L_b(\lambda)}{\partial \zeta_j} = \frac{\partial}{\partial \zeta_j} \sum_r \sum_t \log b_j(y^{(r)}(t)) \delta(x^{\wedge(r)}(t),j) \tag{85}$$

(a) Estimating $\mu_{0j}$
Referring to equation (61), $$0 = \frac{\partial L_b(\lambda)}{\partial \mu_{j0}} = \sum_r \sum_t [y^{(r)}(t) - \{\mu_{j0} + h^{(r)}_j(t)\}] \cdot \sum_j {}^{-1}\delta(x^{\wedge(r)}(t),j) \tag{86}$$

and the estimated value $\mu_{0j}'$ of $\mu_{0j}$ is therefore $$\overline{\mu_{j0}} = \frac{\sum_r \sum_t \{y^{(r)}(t) - h^{(r)}_j(t)\} \delta(x^{\wedge(r)}(t),j)}{\sum_r n^{(r)}_j} \tag{87}$$

(b) Estimating $\Sigma_j$
Again referring to equation (61), the estimated value $\Sigma_j$ is obtained from the following equation because $\partial L_b(\lambda)/\partial \Sigma_j = 0$.

$$\overline{\Sigma_j} = \frac{\sum_r \sum_t e^{(r)}_j(t) e^{(r)}_j(t)^* \delta(x^{\wedge(r)}(t),j)}{\sum_r n^{(r)}_j} \tag{88}$$

(c) Estimating the weighting coefficient w
The estimating equation for the weighting coefficient w is similarly obtained by substituting $L(\lambda)$ for $Q(\lambda,\lambda')$ in the Baum-Welch method. The equivalent equation for equation (67) in the Baum-Welch method is $$\frac{\partial L(\lambda)}{\partial w^{u-1}{}_{mn}} = \sum_{j \in s^{u-1}{}_{mn}} \sum_t \delta(x^{\wedge}(t),j) Z^\mu_j n(t)^* \Sigma_j^{-1} e_j(t) o_j{}^{u-1} m(t). \tag{89}$$

In the above descriptions, the input/output characteristics of each unit in the neural network are linear in the input layer and non-linear in the intermediate and output layers in both the forward-backward method and Viterbi method, but it is also possible for the output layer characteristics to be linear. In this case, the equation corresponding to equation (74) for $z^{(r)}{}^\mu_j{}_n(t)$ when $u=U$ and the output units are shared in each state as shown in FIG. 1(l) and (m) is obtained by defining $q^{(r)}{}^\mu_j{}_n(t)=1$ in equation (75). Also, when the unit groups outputting $h^{(r)}_j(t)$ as shown in FIG. 1(f) and (n) are different in each state $q^\mu_j{}_{(j-1)d+k}=1$ in equation (75).

It is also possible for the input/output characteristics of all units to be linear. In this case, the above is true when $u=U$, and when $u\neq U$ the same procedure can be used for calculation using $q^\mu_j{}_n(t)=1$.

How the third problem of the conventional HMM is solved is described next. This is required when performing segmentation in the Viterbi method described above.

When performing the recursive calculation of equation (35), the final frame of each state can be found in reverse sequence from the final frame T of the input pattern along the obtained best path by parallel execution of the operation $B_j(t)=B_i-(t-1)$, $S_j)t)=\hat{\imath}$ when B value i satisfying equation (35) is $\hat{\imath}$. In other words, the state series and final frame in each state can be obtained in reverse sequence from the final frame T in the input pattern by obtaining the state and the final frame in that state where the state preceding state J is $\hat{\imath}=S_J(t)$, the final frame in that state is $\hat{t}=B_J(t)$, the state two before state J is $\hat{\imath}=S_{\hat{\imath}}(t)$, and the final frame in that state is $\hat{t}=B_i(t)$, until $B_i(t)=0$. Thus, when the final frame for state j is $t_j$ and the first frame is $B_j(t_j)+1$, the frame number corresponding to state j will be $n_{ij}=t_j-B_j(t_j)$. In addition, the input feature vectors for state j will be $y(B_j(t_j)+1)-y(t_j)$. The values $n^{(r)}_i$, $n^{(r)}_{ij}$, $\delta(x^{(r)}(t),j)$ used when estimating the parameters with the Viterbi method can thus be obtained through this process.

This model causes the signal paths in the neural network to correspond to the states of the HMM, and can be formulated with the same framework as a conventional DP matching model through simplification. This is described next.

In the above HMM the observation probability of any desired state series from time $t_1$ to $t_2$ is assumed to be equal. When the model shown in FIG. 10 is used and the transition probability $a_{ij}$ is defined $a_{ij}=\frac{1}{3}$ (where $j=1, 1+1, 1+2$), equation (90) is formed $$\sum_{t=t_1+1}^{t_2} \log a_{x(t-1)x(t)} = (t_2 - t_1)\log \frac{1}{3} \tag{90}$$

and the observation probability of any desired state series from time $t_1$ to $t_2$ is equal. Thus, if the Viterbi algorithm is applied, equation (34) is transformed into equation (91).

$$\phi_j(t) = \tag{91}$$

$$\max_{x(1),x(2),\ldots,x(t)=j} \left[\sum_{k=1}^{t} \log a_{x(k-1)x(k)} + \sum_{k=1}^{t} \log b_{x(k)}(y(k))\right] =$$

$$(t-1)\log\frac{1}{3} + \max_{x(1),x(2),\ldots,x(t)=j}\left[\sum_{k=1}^{t} \log b_{x(k)}(y(k))\right]$$

and equation (92) is therefore also formed.

$$\Phi_{J+1}(T+1) = T\log\frac{1}{3} + \max_x\left[\sum_{t=1}^{T} \log b_{x(t)}(y(t))\right] \tag{92}$$

If equation (93) is stated $$\phi_j(t) = \max_{x(1)x(2)\ldots x(t)}\left[\sum_{k=1}^{t} \log b_{x(k)}(y(k))\right] \tag{93}$$

the recursive equation $$\phi_j(t) = \max_i[\phi_i(t-1) + \log b_j(y(t))] \tag{94}$$

is calculated as the initialization value for equation (95)

$$\phi_{(1)}(1) = \log b_1(y(1))$$

$$\phi_{(j)}(1) = -\infty \text{ for } j \neq 1$$

$$\phi_{(j)}(1) = -\infty \text{ for } j = -1,0 \quad (95)$$

and the likelihood is obtained from equation (96)

$$p(\lambda) = \phi_{J+1}(T+1) \quad (96)$$

In other words, because T log($\frac{1}{3}$) is a quantity related only to the number of frames in the input pattern, it is common to all models when comparing the likelihood of each model to the input pattern Y and can therefore be omitted. As a result, the recursive equation (equation (94)) is calculated, and equation (96) is used to obtain the likelihood.

The parameter estimating method of this embodiment is the same in principle to that of the HMM described above. The transition probability of the above HMM ignores this, and the parameter $b_j(y(t))$ can be used for $\{\mu_{0j}\}$ and w in the forward-backward method or Viterbi method as in the above HMM.

Figure 18:
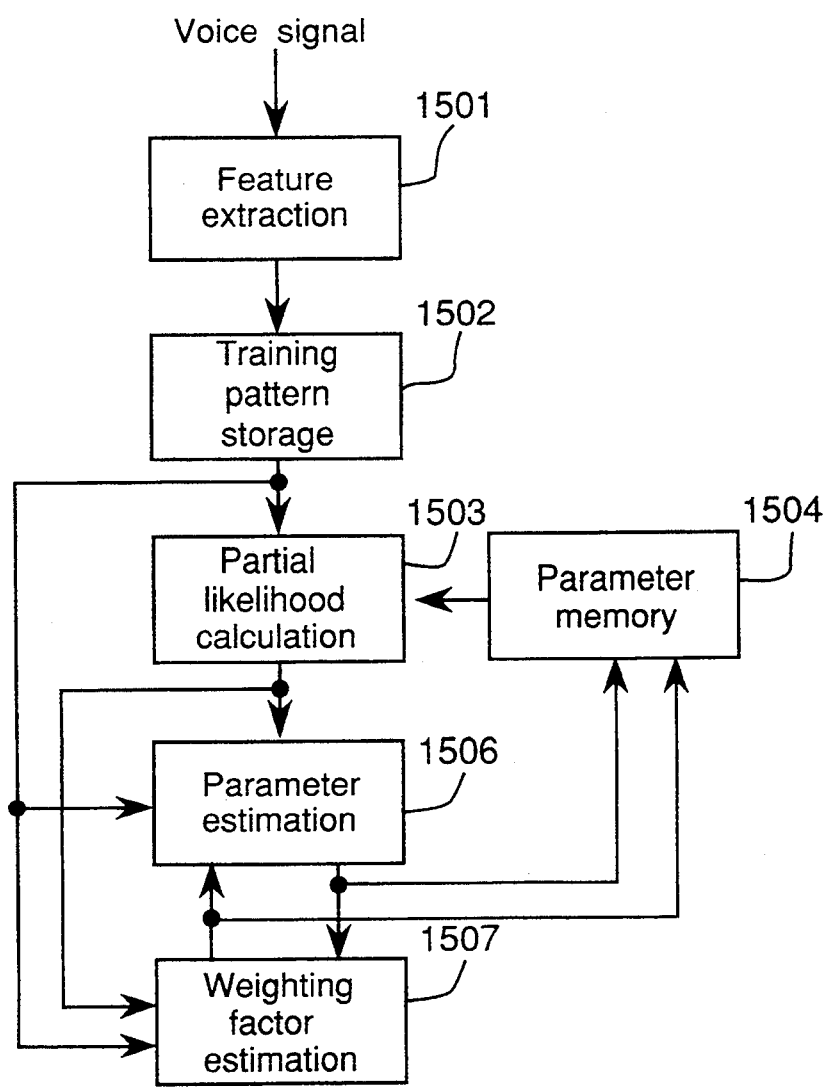
FIG. 18 is a block diagram of the third embodiment for estimating the parameters of the model according to the present invention.

FIG. 18 is another embodiment of the invention for parameter estimating using the forward-backward method. This embodiment differs from that shown in FIG. 12 in the elimination of the transition probability estimating means 1105. Except for the different expression of the likelihood as stated above, the feature extraction means 1501, training pattern storage means 1502, partial likelihood calculation means 1503, parameter storage means 1504, probability distribution parameter estimating means 1506, and weighting coefficient estimating means 1507 are functionally identical to the corresponding elements 1104–1104, 1106, and 1107 in FIG. 12.

Figure 19:
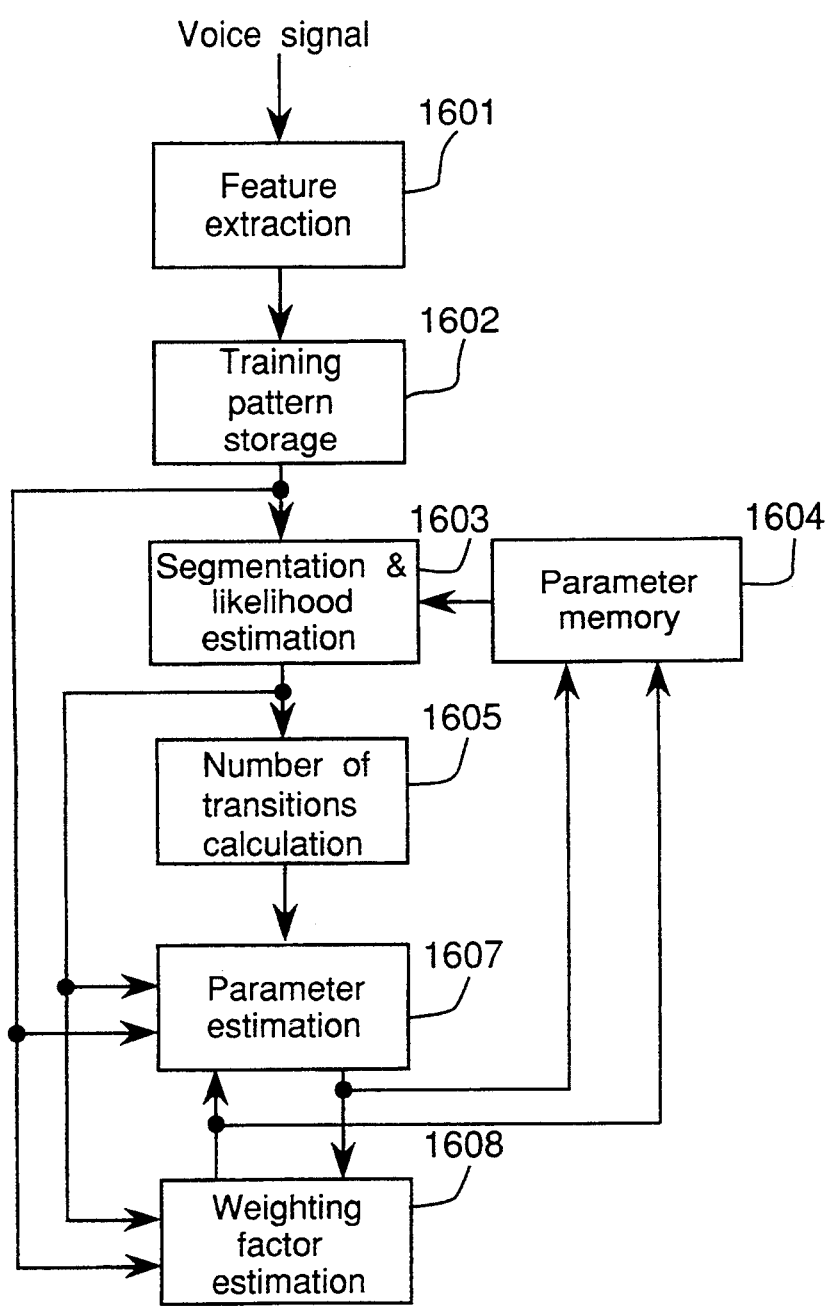
FIG. 19 is a block diagram of the fourth embodiment for estimating the parameters of the model according to the present invention.

FIG. 19 is another embodiment of the invention for parameter estimating using the Viterbi method. This embodiment differs from that shown in FIG. 13 in the elimination of the transition probability estimating means 1306. Except for the different expression of the likelihood as stated above, the feature extraction means 1601, training pattern storage means 1602, segmentation and likelihood calculation means 1603, parameter storage means 1604, transition number calculating means 1605, probability distribution parameter estimating means 1607, and weighting coefficient estimating means 1608 are functionally identical to the corresponding elements 1301–1305, 1307, and 1308 in FIG. 15.

If the variance-covariance matrix of $b_j(y(t))$ is a simple matrix, equation (91) is transformed into equation (97), and equation (92) to (98).

$$\Phi_j(t) = \quad (97)$$

$$\max_{x(1),x(2),\ldots,x(t)=j}\left[\sum_{k=1}^{t}\log a_{x(k-1)x(k)} + \sum_{k=1}^{t}\log b_{x(k)}(y(k))\right] =$$

$$(t-1)\log\frac{1}{3} + t\left[\frac{d}{2}\log\frac{1}{2\pi}\right] -$$

$$\frac{1}{2}\max_{x(1),x(2),\ldots,x(t)=j}\left[\sum_{k=1}^{t}\{y(k) - \mu_{x(k)}(k)\}^*\{y(k) - \mu_{x(k)}(k)\}\right]$$

The maximizing problem is transformed into a minimizing problem by changing the sign, and by stating equation (99)

$$\Phi_{J+1}(T+1) = T\left[\log\frac{1}{3} + \frac{d}{2}\log\frac{1}{2\pi}\right] - \quad (98)$$

$$\frac{1}{2}\max_{x}\left[\sum_{t=1}^{T}\{y(t) - \mu_{x(t)}(t)\}^*\{y(t) - \mu_{x(t)}(t)\}\right]$$

$$\eta_j(t) = \quad (99)$$

$$\min_{x(1)x(2)\ldots x(t)}\left[\sum_{k=1}^{t}\{y(k) - \mu_{x(k)}(k)\}^*\{y(k) - \mu_{x(k)}(k)\}\right]$$

the recursive equation (100) is calculated as the initialization value for equation (101), and the un-likelihood is obtained from equation (102).

$$\eta_j(t) = \min_j[\eta_j(t-1) + \{y(t) - \mu_j(t)\}^*\{y(t) - \mu_j(t)\}] \quad (100)$$

$$\eta_1(1) = \{y(1) - \mu_1(1)\}^*\{y(1) - \mu_1(1)\} \quad (101)$$

$$\eta_j(1) = \infty \text{ for } j \neq 1$$

$$\eta_j(t) = \infty \text{ for } j = -1,0$$

$$p(\lambda) = \eta_{J+1}(T+1) \quad (102)$$

In this case, the likelihood of observation increases as the value of p($\lambda$) decreases.

Figure 20:
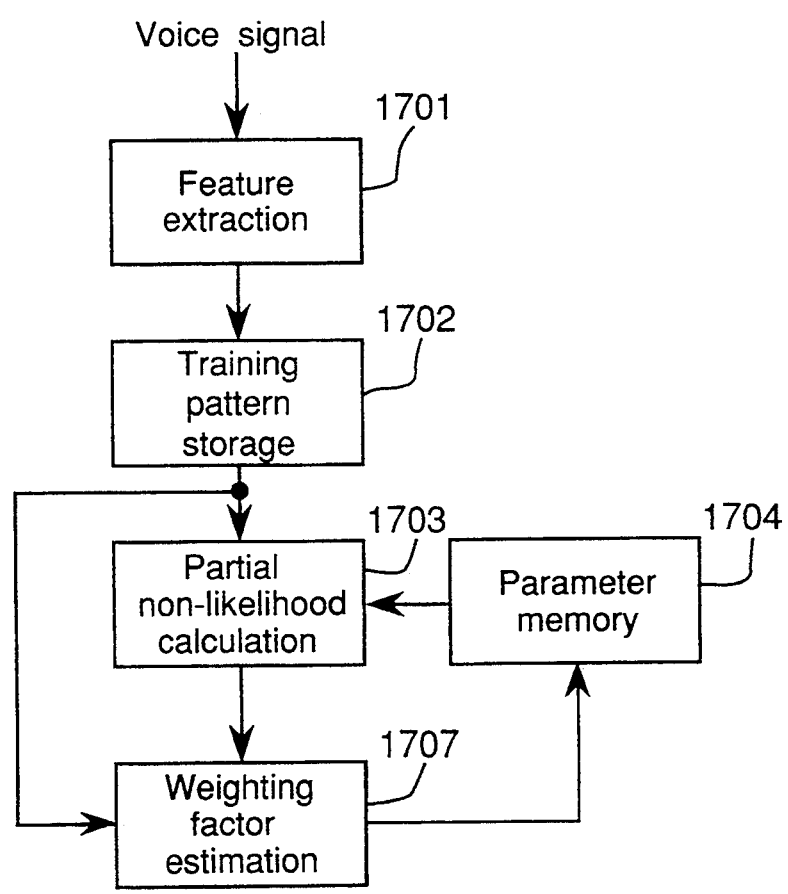
FIG. 20 is a block diagram of the fifth embodiment for estimating the parameters of the model according to the present invention.

FIG. 20 is another embodiment of the invention for parameter estimating using the forward-backward method. This embodiment differs from that shown in FIG. 18 in the further elimination of the probability distribution parameter estimating means 1506. Except for the different expression of the likelihood as stated above, the elements identified as 1701–1704 and 1707 are functionally identical to the corresponding elements 1501–1504 and 1507 in FIG. 18 except that the partial likelihood calculation means 1503 in FIG. 18 is the partial un-likelihood calculation means 1703. The target function for weighting coefficient estimating in the weighting coefficient estimating means 1707 is the un-likelihood of observation, and the goal is to minimize this value.

Figure 21:
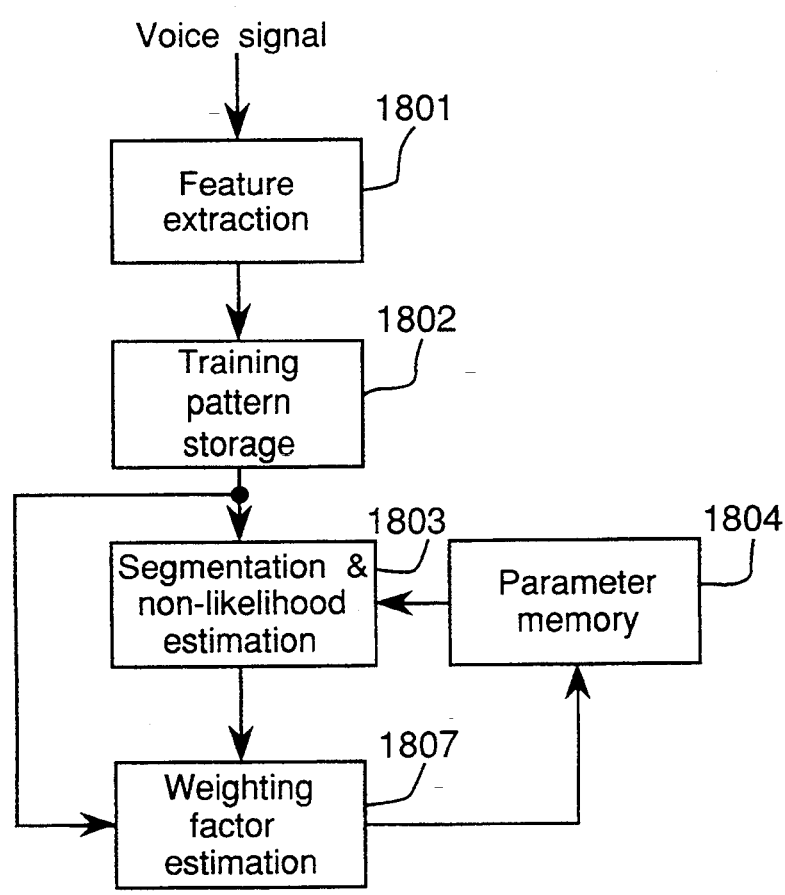
FIG. 21 is a block diagram of the sixth embodiment for estimating the parameters of the model according to the present invention.

FIG. 21 is another embodiment of the invention for parameter estimating using the Viterbi method. This embodiment differs from that shown in FIG. 19 in the further elimination of the transition number calculating means 1605 and probability distribution parameter estimating means 1607. Except for the different expression of the likelihood as stated above, the elements identified as 1801–1804 and 1808 are functionally identical to the corresponding elements 1601–1604 and 1608 in FIG. 19 except that it is necessary to change the segmentation and likelihood calculation means 1603 to a segmentation and un-likelihood calculation means 1803. Furthermore, the target function for weighting coefficient estimating in the weighting coefficient estimating means 1808 is the un-likelihood of observation, and the goal is to minimize this value as with the embodiment shown in FIG. 20 above.

In each of the embodiments shown in FIGS. 18–21, there are two methods of estimating the weighting coefficients as described previously.

In addition, the preferred embodiments of the invention described hereinabove use a neural network as a predicting means, but it is also possible to achieve a model for pattern conversion by applying the present invention to a dynamic neural network as described in Sakoe, H. and Iso, K., "Dynamic Neural Network—A New Speech Recognition Model Based on Dynamic Programming and Neural Network", IEICE Technical Report, SP87-102(1987-12), as a model in which the paths from the input layer to the output layer correspond to each state of the HMM.

As described hereinabove, a signal analyzer according to the present invention can apply a neural network with a high recognition rate when used to recognize static patterns to such dynamic time series patterns as speech by having the transmission paths of the signals in the neural network correspond to the states of the HMM.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A signal analyzer comprising a neural network of plural interconnected units with one or more inputs and outputs, and a unique weighting coefficient assigned to each connection to weight the signals flowing through, and comprising
   - an input unit group to which are input the components of plural vectors included in the input feature vector series $\{y(t)\}$,
   - an output unit group which outputs the converted vectors, which are converted by passing the components of input vectors to the input unit through each unit and associated connections,
   - and the connections from the input unit group to the output unit group are grouped into a specific number of overlapping path groups, and each path group corresponds to the states or state transitions of a Markov chain.

2. A signal analyzer according to claim 1 where an output value of the neural network path group j (j=1, 2, ..., J) is a predictive value of the path group j for y(t) or a value related to the predictive value.

3. A signal analyzer according to claim 2, comprising a Hidden Markov Model corresponding to recognition categories $C_1, C_2, \ldots, C_M$, and computing equation (4)

$$m = \underset{m}{\mathrm{argmax}} L(\lambda m) \tag{4}$$

where $\lambda_m$ is the set of Hidden Markov Model parameters for category $C_m$, for recognition pattern Y to return $C_m$ as a recognition result.

4. A signal analyzer according to claim 2, comprising a parameter estimating means, which comprises a likelihood calculation means for computing equation (6)

$$\sum_{X^{(r)}} P\{E^{(r)}(X^{(r)}), X^{(r)} | \lambda\} \tag{6}$$

for $E^{(r)}(X^{(r)})$ for the r-th training pattern when the set of parameters of the circuit network is defined as the weighting coefficient w at a certain stage of the sequential estimating process during sequential estimating of the parameters of category C for the observation patterns $Y^{(1)}, Y^{(2)}, \ldots, Y^{(R)}$ (where $Y^{(r)} = \{Y^{(r)}(t)\}$) associated with category C, and
   - a parameter correction quantity calculation means for computing the correction amount $\Delta w$ that should increase the likelihood,
   - for estimating the parameters of category C by repeating the operation of substituting the value $w + \Delta w$ for w and calculating the likelihood of the new w for the observation pattern $Y^{(r+1)}$ by means of the likelihood calculation means starting from a suitable value for w and repeating the operation for $r = 1, 2, \ldots, R$ until a predetermined condition is satisfied.

5. A signal analyzer according to claim 2, comprising a dynamic programming means for inputting the input feature vector series Y to a model, and obtaining by a dynamic programming method the minimum cumulative value of the predictive error power based on a predictive model for the feature vector series Y.

6. A signal analyzer according to claim 1, further comprising a probability distribution parameter storage means for storing the parameters defining the probability distribution of a predictive error vector $e_j(t)$ for the input feature vector series $Y = \{y(t)\}$ based on the path group j of the neural network, and
   - a likelihood calculation means for calculating the likelihood of model 1 for the input feature vector series Y from an observation density of each state or each state transition calculated using the parameters stored in the probability distribution parameter storage means by applying equation (1)

$$L(\lambda) = \sum_x P\{E(X), X | \lambda\} \tag{1}$$

where X is a state series $X = x\{t\}$ produced by the model and $E(X) = \{e_{x(t)}(t)\}$.

7. A signal analyzer according to claim 1, further comprising a probability distribution parameter storage means for storing the parameters defining the probability distribution of a predictive error vector $e_j(t)$ for the input vector series $Y = \{y(t)\}$ based on the path group j of the neural network, and
   - a likelihood calculation means for calculating the likelihood of model 1 for the input vector series Y from the probability density of each state or each state transition calculated using the parameters stored in the probability distribution parameter storage means by applying either equation (2) or (3)

$$L(\lambda) = \max_x P\{E(X), X | \lambda\} \tag{2}$$

$$L(\lambda) = \max_x \log P\{E(X), X | \lambda\} \tag{3}$$

wherein X is the state series $X = x\{t\}$ produced by the model and $E(X) = \{e_{x(t)}(t)\}$.

* * * * *